United States Patent
Zhang et al.

(10) Patent No.: US 11,395,200 B2
(45) Date of Patent: Jul. 19, 2022

(54) TERMINAL CONFIGURATION METHOD AND RELATED COMMUNICATIONS DEVICE

(71) Applicant: HUAWEI TECHNOLOGIES CO., LTD., Shenzhen (CN)

(72) Inventors: Lili Zhang, Beijing (CN); Guorong Li, Shenzhen (CN); Hongcheng Zhuang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 132 days.

(21) Appl. No.: 16/345,193

(22) PCT Filed: Oct. 25, 2016

(86) PCT No.: PCT/CN2016/103231
§ 371 (c)(1),
(2) Date: Apr. 25, 2019

(87) PCT Pub. No.: WO2018/076176
PCT Pub. Date: May 3, 2018

(65) Prior Publication Data
US 2019/0289516 A1   Sep. 19, 2019

(51) Int. Cl.
*H04W 36/08* (2009.01)
*H04W 36/00* (2009.01)
(Continued)

(52) U.S. Cl.
CPC ....... *H04W 36/08* (2013.01); *H04W 36/0061* (2013.01); *H04W 36/0072* (2013.01);
(Continued)

(58) Field of Classification Search
CPC .......... H04W 36/00837; H04W 36/08; H04W 36/0061; H04W 36/0072; H04W 36/0077; H04W 36/32; H04W 36/245
See application file for complete search history.

(56) References Cited

U.S. PATENT DOCUMENTS

| | | | |
|---|---|---|---|
| 2012/0039181 A1* | 2/2012 | Aziz | H04W 36/245 370/241 |
| 2014/0073337 A1 | 3/2014 | Hong et al. | |

(Continued)

FOREIGN PATENT DOCUMENTS

| | | |
|---|---|---|
| CN | 101925148 A | 12/2010 |
| CN | 104735730 A | 6/2015 |

(Continued)

OTHER PUBLICATIONS

3GPP TSG-RAN WG2 Meeting #95, R2-164795, Nokia:"Mobility scenarios and requirements in NR", Gothenburg, Sweden, Aug. 22-26, 2016, total 5 pages.
(Continued)

*Primary Examiner* — Marcos L Torres
(74) *Attorney, Agent, or Firm* — Rimon PC

(57) ABSTRACT

The present invention discloses a terminal configuration method, including: obtaining, by a network device, cell access information and/or beam access information; determining configuration information based on the cell access information and/or the beam access information; and sending the configuration information to a terminal. The present invention further discloses a network device and a terminal that can implement the foregoing terminal configuration method. In the present invention, mobility of the terminal can be accurately determined, so that cell reselection performance, cell handover performance, or beam change performance of the terminal can be improved.

11 Claims, 11 Drawing Sheets

(51) Int. Cl.
  *H04W 36/32* (2009.01)
  *H04W 36/24* (2009.01)
(52) U.S. Cl.
  CPC . *H04W 36/0077* (2013.01); *H04W 36/00837* (2018.08); *H04W 36/32* (2013.01); *H04W 36/245* (2013.01)

(56) References Cited

U.S. PATENT DOCUMENTS

| | | | |
|---|---|---|---|
| 2015/0222345 A1* | 8/2015 | Chapman | H04B 7/0632 370/332 |
| 2016/0374000 A1* | 12/2016 | Kim | H04W 48/20 |
| 2017/0230875 A1* | 8/2017 | Tavildar | H04W 36/0069 |
| 2018/0123675 A1 | 5/2018 | Shi et al. | |

FOREIGN PATENT DOCUMENTS

| | | |
|---|---|---|
| CN | 104935363 A | 9/2015 |
| CN | 105556869 A | 5/2016 |
| EP | 2882207 A1 | 6/2015 |
| GB | 2482820 B | 4/2014 |
| WO | 9750272 A2 | 12/1997 |
| WO | 2008133566 A1 | 11/2008 |
| WO | 2012152162 A1 | 11/2012 |
| WO | 2015064951 A1 | 5/2015 |

OTHER PUBLICATIONS

3GPP TSG-RAN WG2 #94, R2-165540, Ericsson:"RRM measurements and mobility control in RRC Connected", Gothenburg, Sweden, May 22-26, 2016, total 3 pages.
3GPP TSG RAN WG2 Meeting #94, R2-165015, Intel Corporation:"Measurement in NR", Gothenburg, Sweden, Aug. 22-26, 2016, total 7 pages.
3GPP TSG-RAN WG2 Meeting #95 R2-165119, ZTE Corporation, ZTE Microelectronics,"Consideration on the Measurement for the NR",Göteborg, Sweden, Aug. 22-26, 2016,total 4 pages.
3GPP TSG-RAN WG2 Meeting #95, R2-165107, MediaTek Inc. "Mobility procedures in NR networks", Gothenburg, Sweden, Aug. 22-26, 2016, total 5 pages.
3GPP TSG RAN WG2 #95, R2-165150, Samsung:"Measurements for Cell-level Mobility in High Frequency NR", Göteborg, Sweden, Aug. 22-26, 2016, total 4 pages.
3GPP TSG-RAN WG2 Meeting #95 , R2-165289, ASUSTeK:"Consideration on beamforming for cell level mobility", Göteborg, Sweden, Aug. 22-26, 2016, total 3 pages.
3GPP TSG-RAN WG2 Meeting #94, R2-163365, Samsung:"Introduction of "Cell" concept in 5G", Nanjing, China, May 23-27, 2016, total 4 pages.
3GPP TSG-RAN WG2 #94, R2-163484, MediaTek Inc.:"Mobility Supporting for HF-NR", Nanjing, China, May 23-27, 2016, total 6 pages.
3GPP TSG Ran WG2 Meeting #95, R2-165029, Sony:"CIoT signaling optimisation reuse for Relay", Göteborg, Sweden, Aug. 22-26, 2016, total 3 pages.
3GPP TSG RAN WG2 #94 R2-163652, Samsung,"Discussion on Beam Measurement for 5G New Radio Interface in mmWave Frequency Bands",Nanjing, China, May 23-27, 2016,total 4 pages.
3GPP TSG RAN WG2 Meeting #94, R2-163578, Intel Corporation "Discussion of mobility related definition and terminology in NR", Nanjing, China, May 23-27, 2016, total 3 pages.
3GPP TS 36.321 V14.0.0 (Sep. 2016);3rd Generation Partnership Project;Technical Specification Group Radio Access Network;Evolved Universal Terrestrial Radio Access (E-UTRA);Medium Access Control (MAC) protocol specification (Release 14);total 96 pages.
3GPP TS 36.300 V14.0.0 (Sep. 2016), 3rd Generation Partnership Project;Technical Specification Group Radio Access Network;Evolved Universal Terrestrial Radio Access (E-UTRA) and Evolved Universal Terrestrial Radio Access Network (E-UTRAN);Overall description;Stage 2(Release 14), 314 pages.
3GPP TS 36.331 V14.0.0 (Sep. 2016);3rd Generation Partnership Project; Technical Specification Group Radio Access Network; Evolved Universal Terrestrial Radio Access (E-UTRA);Radio Resource Control (RRC);Protocol specification (Release 14);total 644 pages.

* cited by examiner

TERMINAL CONFIGURATION METHOD AND RELATED COMMUNICATIONS DEVICE

CROSS-REFERENCE TO RELATED APPLICATIONS

This application is a national stage of International Application No. PCT/CN2016/103231, filed on Oct. 25, 2016, which is hereby incorporated by reference in its entirety.

TECHNICAL FIELD

The present invention relates to the communications field, and in particular, to a terminal configuration method and a related communications device.

BACKGROUND

Long Term Evolution Advanced (Long Term Evolution Advanced, LTE-A for short) is an evolution of Long Term Evolution (Long Term Evolution, LTE for short), and its objective is to satisfy a higher requirement of a wireless communications market with more applications in the future while maintaining backward compatibility with the LTE. In the LTE-A, key technologies such as carrier aggregation (Carrier Aggregation), enhanced uplink/downlink multiple-antenna, coordinated multipoint transmission/reception (Coordinated Multi-point Tx and Rx), a relay (Relay), and enhanced inter-cell interference coordination for heterogeneous networks (Enhanced Inter-cell Interference Coordination for Heterogeneous Network) are used, so that a peak data rate, peak spectral efficiency, cell spectral efficiency, and cell edge-user performance of a wireless communications system can be greatly improved, and networking efficiency of an entire network can also be improved.

In the LTE-A, not only a base station corresponding to a cell (cell) is disposed, but also a transmission and reception point (Transmission and Reception Point) between a base station and user equipment (User Equipment, UE for short) may be disposed. A transmission and reception point group (Transmission and Reception Point Group, TRPG for short) including several TRPs corresponds to one virtual cell (Virtual Cell). UE may perform reselection or be handed over between different TRPs or TRPGs.

When passing different cells, a terminal measures signals of a serving cell and a neighboring cell, and then performs cell reselection or cell handover based on measured information and a configuration parameter (such as a threshold). When a speed of the terminal is in different states, the terminal needs to perform corresponding measurement; otherwise, the terminal has quite high power consumption. To reduce energy consumption and improve quality of service, in the prior art, corresponding configuration parameters are set for different mobility states, to improve cell reselection or cell handover performance.

In an existing LTE technology, cells have basically a same size, and the UE has two states: an idle (IDLE) state and a connected (CONNECTED) state. The idle state is used as an example below, and an existing terminal configuration method is generally as follows: A base station or UE may determine a quantity of cell reselection times of the UE in a specified time ($T_{CRmax}$). If the quantity of cell reselection times is within (N1, N2] in the time $T_{CRmax}$, it is determined that a mobility status of the UE is a medium-speed mobility state. If the quantity of cell reselection times is greater than N2 in the time $T_{CRmaxHyst}$, it is determined that a mobility status of the UE is a high-speed mobility state. If the quantity of cell reselection times is not greater than N1 in the time $T_{CRmaxHyst}$, it is determined that a mobility status of the UE is a normal-speed mobility state. The terminal may configure a corresponding cell reselection parameter based on a different mobility state, to perform cell reselection.

However, in the LTE-A, there is a positive correlation between a range size of each virtual cell and a quantity of TRPs in the virtual cell. Generally, if a TRPG includes more TRPs, a range of a virtual cell corresponding to the TRPG is larger; otherwise, a range of a virtual cell is smaller. Virtual cells have ranges with different sizes. If an existing UE mobility estimation method is still used to obtain mobility of UEs that access different virtual cells, an obtained result does not coincide with an actual mobility case at all. If the terminal performs configuration for a cell based on an incorrect result, cell reselection or cell handover performance is poor.

SUMMARY

The present invention provides a terminal configuration method, to accurately determine mobility of a terminal, and improve cell reselection performance, cell handover performance, or beam change performance of the terminal.

A first aspect provides a terminal configuration method, including: obtaining, by a network device, first information and/or second information, determining configuration information based on the first information and/or the second information, and sending the configuration information to a terminal. The first information is cell access information, and the second information is beam access information. In a possible implementation, the cell is a 5G cell, and the network device is a base station or a transmission and reception point TRP; the cell access information includes a cell identifier and/or a residence time of the terminal in the cell; and the beam access information includes a beam identifier and/or a residence time of the terminal in a beam. Further, in a possible implementation, the cell access information further includes a cell type, and the cell type is set based on a quantity of network devices in the cell and/or power of a network device in the cell. Alternatively, in a possible implementation, the cell access information further includes cell capability information, and the cell capability information includes at least one of: beamforming capabilities, beam widths, or beam coverage areas of all or some network devices in the cell.

It can be learned that the network device may obtain the beam access information, determine the configuration information based on the beam access information, and send the configuration information to the terminal. Because a beam change can reflect a change in a mobility status of the terminal, the mobility status of the terminal can be accurately determined based on the beam access information. In this way, appropriate beam change configuration information is configured for the terminal, and beam change performance of the terminal is improved. In addition to a quantity of cells, the cell access information further includes other cell information. The network device may determine a mobility weight in the cell based on the other cell information, then accurately determine the mobility status of the terminal based on the mobility weight, and configure appropriate cell reselection or cell handover configuration information for the terminal, thereby improving cell reselection or cell handover performance. A mobility weighting factor may be any number between 0 and 1.

With reference to the first aspect, in a possible implementation, the cell access information is cell information of a historical cell accessed by the terminal under a first configuration condition; and the beam access information is beam information of a historical cell accessed by the terminal under a second configuration condition. In a possible implementation, the first configuration condition is that a quantity of historical cells accessed by the terminal is equal to a quantity of configured cells, or a network connection status of the terminal is any one of a first state, a second state, or a third state, or a time segment in which the terminal accesses the historical cell is a configured time segment; and the second configuration condition is that a quantity of beams, accessed by the terminal, in the historical cell is equal to a quantity of configured beams, or a network connection status of the terminal is any one of a first state, a second state, or a third state, or a time segment in which the terminal accesses a beam in the historical cell is a configured time segment. The first state is an idle state, the second state is a connected state, the third state is a connected state defined in a 5G or a new radio system, and the connected state may be a connected inactive state.

With reference to the first aspect, in a possible implementation, the obtaining, by a network device, first information and/or second information includes: receiving, by the network device, the first information and/or the second information from the terminal; or receiving, by the network device, the first information and/or the second information from a surrounding network device, a core network device, or a central controller.

With reference to the first aspect, in a possible implementation, before the receiving, by the network device, the first information and/or the second information from the terminal, the method further includes: sending, by the network device, third information to the terminal, where the third information is used to instruct the terminal to send the first information and/or the second information.

With reference to the first aspect, in a possible implementation, before the sending, by the network device, third information to the terminal, the method further includes: receiving, by the network device, fourth information sent by the terminal, where the fourth information is capability information of the terminal for obtaining the first information and/or the second information, namely, whether the terminal can obtain the first information and/or the second information.

With reference to the first aspect, in a possible implementation, the determining, by the network device, configuration information based on the first information and/or the second information may be specifically: when the network device receives the first information and/or the second information from the terminal, determining, by the network device, a mobility status of the terminal based on the first information and/or the second information; and determining, by the network device, the configuration information based on the mobility status of the terminal.

With reference to the first aspect, in a possible implementation, the first information includes a cell type of a historical cell accessed by the terminal, and the determining, by the network device, a mobility status of the terminal based on the first information and/or the second information may be specifically: determining, by the network device, a mobility weight for each historical cell based on a cell type; determining a target quantity of change times based on the mobility weights in the historical cells; and determining, based on a preset correspondence between a quantity of change times and a mobility status, a mobility status corresponding to the target quantity of change times.

With reference to the first aspect, in a possible implementation, the first information includes a cell type of a historical cell accessed by the terminal, and the determining, by the network device, a mobility status of the terminal based on the first information and/or the second information may be specifically: determining, by the network device, a mobility weight for each historical cell based on a cell type; determining, by the network device, a target quantity of change times based on the mobility weights in the historical cells; and determining, by the network device based on a preset correspondence between a quantity of change times and a mobility status, a mobility status corresponding to the target quantity of change times. In this embodiment, based on the quantity of network devices or the power of the network device, the cell type may be set, and the corresponding mobility weight in the cell may be set. Generally, a larger quantity of network devices in a cell results in a larger mobility weight in the cell, and a smaller quantity of network devices in a cell results in a smaller mobility weight in the cell. Alternatively, higher power of a network device in a cell results in a larger mobility weight in the cell, and lower power of a network device in a cell results in a smaller mobility weight in the cell.

With reference to the first aspect, in a possible implementation, the first information includes residence duration of the terminal in the cell, and the determining, by the network device, a mobility status of the terminal based on the first information and/or the second information may be specifically: determining, by the network device, a cell coverage area for each historical cell based on the cell type, and determining a moving speed of the terminal in the cell based on the cell coverage area and the residence duration of the terminal in the cell; and determining the mobility status of the terminal based on the moving speed in each historical cell. In this embodiment, a correspondence between a speed interval and a mobility status may be set, and the mobility status of the terminal may be determined based on a linear average value or a non-linear average value of moving speeds in cells.

With reference to the first aspect, in a possible implementation, the first information includes cell capability information of a historical cell accessed by the terminal, and the determining, by the network device, a mobility status of the terminal based on the first information and/or the second information may be specifically: determining, by the network device, a mobility weight for each historical cell based on the cell capability information; determining a target quantity of change times based on the mobility weights in the historical cells; and determining, based on a preset correspondence between a quantity of change times and a mobility status, a mobility status corresponding to the target quantity of change times. The cell capability information includes at least one of a beamforming capability, a beam width, or a beam coverage area of the network device. Generally, a higher beamforming capability, a larger beam width, or a larger beam coverage area of a network device in a cell results in a larger mobility weight in the cell, and a lower beamforming capability, a smaller beam width, or a smaller beam coverage area of a network device in a cell results in a smaller mobility weight.

With reference to the first aspect, in a possible implementation, the determining, by the network device, a mobility status of the terminal based on the first information and/or the second information may be specifically: determining, by the network device, a mobility weight for each historical cell based on a quantity of beams in the cell; determining a target quantity of change times based on the mobility weights in the historical cells; and determining, based on a preset correspondence between a quantity of change times and a mobility status, a mobility status corresponding to the target quantity of change times. This embodiment provides a method for determining a mobility weight in a cell based on a quantity of beams.

With reference to the first aspect, in a possible implementation, the determining, by the network device, a mobility status of the terminal based on the first information and/or the second information may be specifically: obtaining, by the network device, a target quantity of beam switching times based on the second information, where the second information is the beam information of the historical cell accessed by the terminal; and determining, by the network device based on a preset correspondence between a quantity of beam switching times and a mobility status, a mobility status corresponding to the target quantity of beam switching times. When different network devices have similar beam coverage areas, the mobility status of the terminal may be determined based on the quantity of beam change times in this embodiment.

Further, in a possible implementation, the determining, by the network device based on a preset correspondence between a quantity of change times and a mobility status, a mobility status corresponding to the target quantity of change times may be specifically: if the target quantity of change times is greater than or equal to a first threshold, determining that the mobility status of the terminal is a first mobility state; if the target quantity of change times is greater than or equal to a second threshold and less than the first threshold, determining that the mobility status of the terminal is a second mobility state; or if the target quantity of change times is greater than or equal to a third threshold and less than the second threshold, determining that the mobility status of the terminal is a third mobility state.

A second aspect provides a terminal configuration method, including: sending, by a terminal, first information and/or second information to a network device, where the first information is cell access information, and the second information is beam access information; and receiving configuration information sent by the network device.

With reference to the second aspect, in a possible implementation, when the terminal sends the first information to the network device, the configuration information includes a cell reselection threshold, a cell reselection hysteresis parameter, cell reselection hysteresis duration, and a cell reselection mobile-state scale factor, and/or a cell handover threshold, a cell handover hysteresis parameter, a cell handover triggering time, and a cell handover mobile-state scale factor; and/or when the terminal sends the second information to the network device, the configuration information includes at least one of a beam change threshold, a beam change hysteresis parameter, beam change hysteresis duration, a beam change mobile-state scale factor, a beam change triggering time, a beam change evaluation time, and an additional evaluation time, where the beam change is beam increase or beam switching.

With reference to the second aspect, in a possible implementation, before the terminal sends the first information and/or the second information to the network device, the terminal receives third information sent by the network device, and the terminal sends the first information and/or the second information to the network device according to the third information.

With reference to the second aspect, in a possible implementation, before the terminal receives the third information sent by the network device, the terminal sends fourth information to the network device, where the fourth information is capability information of the terminal for obtaining the first information and/or the second information.

With reference to the second aspect, in a possible implementation, the terminal receives a mobility status of the terminal that is sent by the network device.

With reference to the second aspect, in a possible implementation, after the terminal receives the configuration information sent by the network device, when the configuration information includes the cell reselection threshold, the cell reselection hysteresis parameter, the cell reselection hysteresis duration, and the cell reselection mobile-state scale factor, the terminal performs cell reselection based on the configuration information; when the configuration information includes the cell handover threshold, the cell handover hysteresis parameter, cell handover hysteresis duration, and the cell handover mobile-state scale factor, the terminal performs cell handover based on the configuration information; or when the configuration information includes the beam change threshold, the beam change hysteresis parameter, the beam change hysteresis duration, and the beam change mobile-state scale factor, the terminal performs beam changing based on the configuration information.

A third aspect provides a terminal configuration method, including: configuring, by a network device, fifth information and/or sixth information based on beam access information, where the fifth information includes at least one of the first threshold, a second threshold, or a third threshold, and the sixth information includes at least one of the first mobility state, a second mobility state, or a third mobility state; and sending the fifth information and/or the sixth information to the terminal.

With reference to the third aspect, in a possible implementation, if a quantity of beam access times is greater than or equal to the first threshold, a mobility status of the terminal is the first mobility state; if a quantity of beam access times is greater than or equal to the second threshold and less than the first threshold, a mobility status of the terminal is the second mobility state; or if a quantity of beam access times is greater than or equal to the third threshold and less than the second threshold, a mobility status of the terminal is the third mobility state.

A fourth aspect provides a method for determining mobility of a terminal, including: obtaining, by a terminal, first information and/or second information, where the first information is cell access information, and the second information is beam access information; and determining, by the terminal, a mobility status of the terminal based on the first information and/or the second information. In a possible implementation, the cell is a 5G cell, and the network device is a base station or a transmission and reception point TRP; the cell access information includes a cell identifier and/or a residence time of the terminal in the cell; and the beam access information includes a beam identifier and/or a residence time of the terminal in a beam. Further, in a possible implementation, the cell access information further includes a cell type, and the cell type is set based on a quantity of network devices in the cell and/or power of a network device in the cell. Alternatively, in a possible implementation, the cell access information further includes cell capability information, and the cell capability information includes at least one of: beamforming capabilities, beam widths, or beam coverage areas of all or some network devices in the cell.

With reference to the fourth aspect, in a possible implementation, before the obtaining, by a terminal, first information and/or second information, the method further includes: receiving, by the terminal, a cell type or cell capability information from a network device.

With reference to the fourth aspect, in a possible implementation, the cell access information is cell information of a historical cell accessed by the terminal under a first configuration condition; and the beam access information is beam information of a historical cell accessed by the terminal under a second configuration condition.

With reference to the fourth aspect, in a possible implementation, the first configuration condition is that a quantity of historical cells accessed by the terminal is equal to a quantity of configured cells, or a network connection status of the terminal is any one of a first state, a second state, or a third state, or a time segment in which the terminal accesses the historical cell is a configured time segment; and the second configuration condition is that a quantity of beams, accessed by the terminal, in the historical cell is equal to a quantity of configured beams, or a network connection status of the terminal is any one of a first state, a second state, or a third state, or a time segment in which the terminal accesses a beam in the historical cell is a configured time segment. The first state is an idle state, the second state is a connected state, and the third state is a connected state defined in a 5G or a new radio system.

With reference to the fourth aspect, in a possible implementation, after the terminal determines the mobility status of the terminal based on the first information and/or the second information, the terminal reports the mobility status to the network device.

With reference to the fourth aspect, in another possible implementation, the terminal receives a mobility status reporting instruction sent by the network device, and the terminal reports the mobility status to the network device based on the mobility status reporting instruction.

With reference to the fourth aspect, in another possible implementation, the determining, by the terminal, a mobility status of the terminal based on the first information and/or the second information may be specifically: determining, by the terminal, a quantity of cell change times based on the first information, where the first information is the cell information of the historical cell accessed by the terminal; and determining the mobility status based on the quantity of cell change times.

With reference to the fourth aspect, in another possible implementation, the determining, by the terminal, a mobility status of the terminal based on the first information and/or the second information may be specifically: determining, by the terminal, a target quantity of beam switching times based on the second information, where the second information is the beam information of the historical cell accessed by the terminal; and determining, based on a preset correspondence between a quantity of beam switching times and a mobility status, a mobility status corresponding to the target quantity of beam switching times.

With reference to the fourth aspect, in another possible implementation, the determining, by the terminal, a mobility status of the terminal based on the first information and/or the second information may be specifically: determining, by the terminal, a cell coverage area for each historical cell based on a cell type, and determining a moving speed of the terminal in the cell based on the cell coverage area and residence duration of the terminal in the cell; and determining, by the terminal, the mobility status of the terminal based on the moving speed in each historical cell.

With reference to the fourth aspect, in a possible implementation, the determining, by the terminal, a mobility status of the terminal based on the first information and/or the second information may be specifically: determining, by the terminal, a mobility weight for each historical cell based on cell capability information of the cell; determining a target quantity of change times based on the mobility weights in the historical cells; and determining, based on a preset correspondence between a quantity of change times and a mobility status, a mobility status corresponding to the target quantity of change times.

With reference to the fourth aspect, in a possible implementation, the first information includes beam information of the cell, and the determining, by the terminal, a mobility status of the terminal based on the second information may be specifically: determining, by the terminal, a mobility weight for each historical cell based on a quantity of beams in the cell; determining a target quantity of change times based on the mobility weights in the historical cells; and determining, based on a preset correspondence between a quantity of change times and a mobility status, a mobility status corresponding to the target quantity of change times.

With reference to the fourth aspect, in a possible implementation, the determining, by the network device based on a preset correspondence between a quantity of change times and a mobility status, a mobility status corresponding to the target quantity of change times may be specifically: if the target quantity of change times is greater than or equal to a first threshold, determining that the mobility status of the terminal is a first mobility state; if the target quantity of change times is greater than or equal to a second threshold and less than the first threshold, determining that the mobility status of the terminal is a second mobility state; or if the target quantity of change times is greater than or equal to a third threshold and less than the second threshold, determining that the mobility status of the terminal is a third mobility state.

A fifth aspect provides a method for determining mobility of a terminal, including: obtaining, by a network device, a mobility status and/or a mobility type of a terminal; determining configuration information based on the mobility status and/or the mobility type of the terminal; and sending the configuration information to the terminal.

With reference to the fifth aspect, in a possible implementation, before the obtaining, by a network device, a mobility status and/or a mobility type of a terminal, the method further includes: obtaining, by the network device, first information and/or second information from the terminal; and the obtaining, by a network device, a mobility status and/or a mobility type of a terminal may be specifically: obtaining, by the network device, the mobility status and/or the mobility type of the terminal based on the first information and/or the second information, where the first information is cell access information, and the second information is beam access information.

With reference to the fifth aspect, in a possible implementation, the obtaining, by the network device, first information and/or second information from the terminal may be specifically: when the mobility type of the terminal is a first mobility type or a third mobility type, obtaining, by the network device, the first information and/or the second information from the terminal by using physical layer signaling or MAC layer signaling; or when the mobility type of the terminal is a second mobility type, obtaining, by the network device, the first information and/or the second information from the terminal by using physical layer signaling, MAC layer signaling, or RRC layer signaling. The first mobility type is a beam change of the terminal between network devices, the second mobility type is cell handover or a beam change of the terminal between network device groups, and the third mobility type is a beam change of the terminal in a network device.

With reference to the fifth aspect, in a possible implementation, before the network device obtains the mobility status and/or the mobility type of the terminal, the network device instructs the terminal to report the mobility status and/or the mobility type, and the network device obtains the mobility status and/or the mobility type of the terminal from the terminal.

With reference to the fifth aspect, in a possible implementation, the network device instructs the terminal to periodically trigger an event or instructs the terminal to report the mobility status and/or the mobility type when the terminal is in a connected state.

With reference to the fifth aspect, in a possible implementation, the configuration information is sent by the network device to the terminal by using physical layer signaling, Media Access Control MAC layer signaling, or radio resource control RRC layer signaling.

A sixth aspect provides a method for determining mobility of a terminal, including: sending, by a terminal, a mobility status and/or a mobility type of the terminal to a network device; and receiving configuration information sent by the network device.

With reference to the sixth aspect, in a possible implementation, the sending, by a terminal, a mobility status and/or a mobility type of the terminal to a network device may be specifically: when the mobility type of the terminal is a first mobility type or a third mobility type, sending, by the terminal, the mobility status and/or the mobility type of the terminal to the network device by using physical layer signaling or MAC layer signaling; or when the mobility type of the terminal is a second mobility type, sending, by the terminal, the mobility status and/or the mobility type of the terminal to the network device by using physical layer signaling, MAC layer signaling, or RRC layer signaling. The first mobility type is a beam change of the terminal between network devices, the second mobility type is cell handover or a beam change of the terminal between network device groups, and the third mobility type is a beam change of the terminal in the network device.

With reference to the sixth aspect, in a possible implementation, after the terminal receives the configuration information sent by the network device, the terminal applies first configuration information to the first mobility type, where the first configuration information includes at least one of a beam change threshold, a beam change hysteresis parameter, beam change hysteresis duration, a beam change mobile-state scale factor, a beam change triggering time, a beam change evaluation time, and an additional evaluation time, and the beam change is beam increase or beam switching; the terminal applies second configuration information to the second mobility type, where the second configuration information includes a cell reselection threshold, a cell reselection hysteresis parameter, cell reselection hysteresis duration, and a cell reselection mobile-state scale factor, and/or a cell handover threshold, a cell handover hysteresis parameter, a cell handover triggering time, and a cell handover mobile-state scale factor; and the terminal applies third configuration information to the third mobility type, where the third configuration information includes at least one of a beam change threshold, a beam change hysteresis parameter, beam change hysteresis duration, a beam change mobile-state scale factor, a beam change triggering time, a beam change evaluation time, and an additional evaluation time.

A seventh aspect provides a network device that can implement the terminal configuration method in the first aspect. The function is implemented by hardware, or may be implemented by hardware by executing corresponding software.

An eighth aspect provides a terminal that can implement the terminal configuration method in the second aspect. The function is implemented by hardware, or may be implemented by hardware by executing corresponding software.

A ninth aspect provides a network device that can implement the terminal configuration method in the third aspect. The function is implemented by hardware, or may be implemented by hardware by executing corresponding software.

A tenth aspect provides a terminal that can implement the method for determining mobility of a terminal in the fourth aspect. The function is implemented by hardware, or may be implemented by hardware by executing corresponding software.

An eleventh aspect provides a network device that can implement the terminal configuration method in the fifth aspect. The function is implemented by hardware, or may be implemented by hardware by executing corresponding software.

A twelfth aspect provides a terminal that can implement the terminal configuration method in the sixth aspect. The function is implemented by hardware, or may be implemented by hardware by executing corresponding software.

It can be learned from the foregoing technical solutions that the embodiments of the present invention have the following advantages:

Because beam change information can reflect the mobility status of the terminal, the network device can accurately determine the mobility status of the terminal based on the beam access information. In this way, appropriate beam change configuration information is configured for the terminal, and beam change performance of the terminal is improved. In addition to the quantity of cells, the cell access information further includes other cell information. The network device may determine the mobility weight in the cell based on the other cell information, then accurately determine the mobility status of the terminal based on the mobility weight, and configure appropriate cell reselection or cell handover configuration information for the terminal, thereby improving cell reselection or cell handover performance.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons skilled in the art based on the embodiments of the present invention without creative efforts shall fall within the protection scope of the present invention.

In the specification, claims, and accompanying drawings of the present invention, the terms "first", "second", "third", "fourth", and so on (if any) are intended to distinguish between similar objects but do not necessarily indicate a specific order or sequence. It should be understood that the data termed in such a way is interchangeable in proper circumstances so that the embodiments described herein can be implemented in other orders than the order illustrated or described herein. Moreover, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

Figure 1:
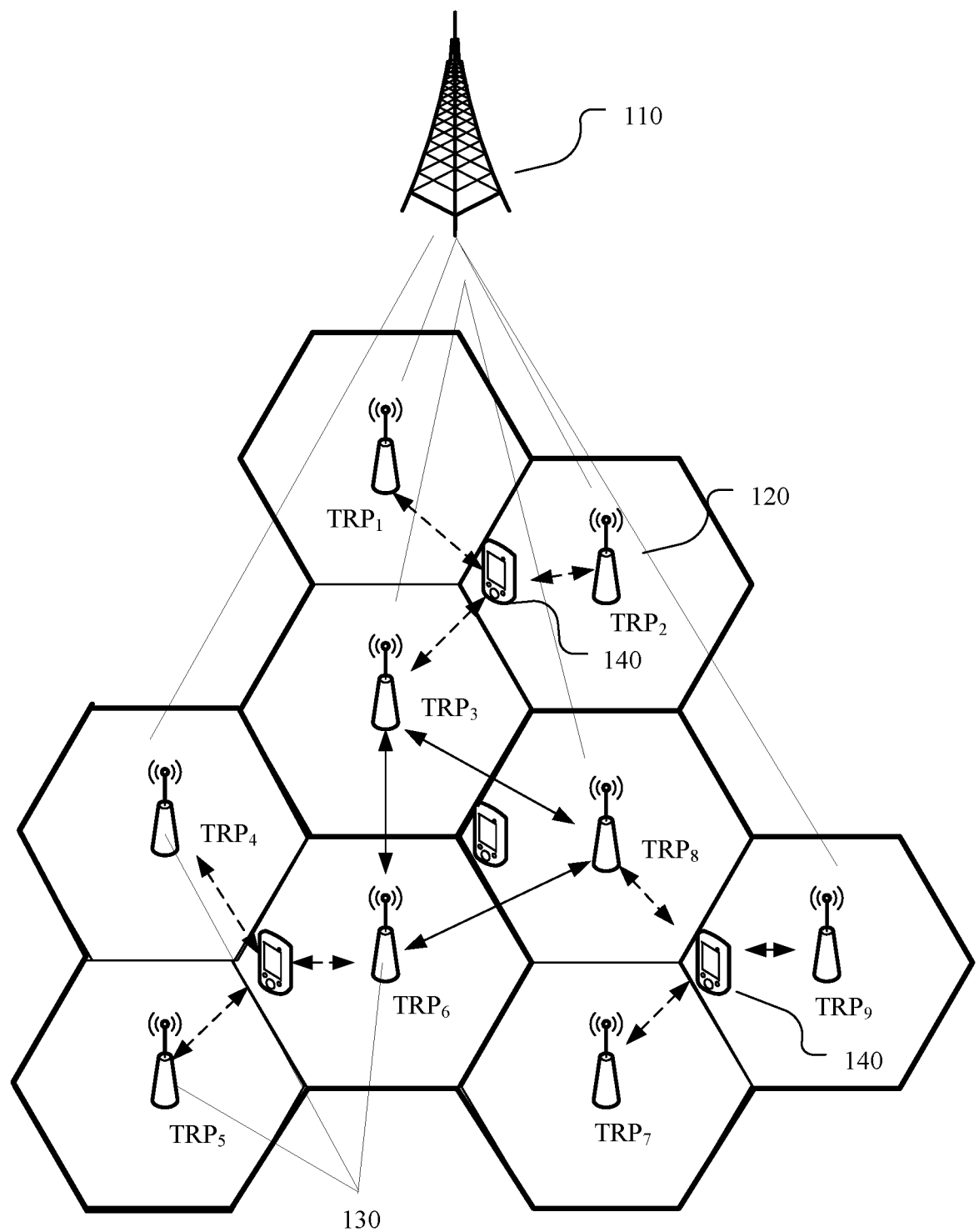
FIG. 1 is a schematic architectural diagram of a communications system according to an embodiment of the present invention.

An embodiment of the present invention provides a method for determining mobility of a terminal. The method is applied to a communications system. The communications system may be a centimeter wave communications system or a millimeter wave communications system. FIG. 1 is a schematic architectural diagram of a communications system 100 according to an embodiment of the present invention. The communications system includes one or more macro base stations 110. The macro base station 110 includes a plurality of cells, and each cell includes one or more network devices 120. When each cell includes a plurality of network devices 120, the plurality of network devices are referred to as one network device group 130, or it may be understood that one network device group 130 includes a plurality of network devices 120. A signal coverage area of the network device group 130 is one cell, and a signal coverage area of one network device 120 may be one small cell. The network device 120 may be a transmission and reception point (Transmission and Reception Point, TRP for short), or a node for receiving information and transmitting information. The TRP is a physical node, and is configured with a plurality of antenna units. Different transmission nodes are geographically separated or may be sectorized. The network device group 130 may be a transmission and reception point group (Transmission and Reception Point Group, TRPG for short). Alternatively, the network device may be a macro base station, a base station to which a cell belongs, a transmission and reception point TRP to which a cell belongs, a micro base station, a small cell, a pico base station, a base station in future 5G or the like. Alternatively, the network device may be a radio remote unit (Radio Remote Unit, RRU for short), to make radio frequency modules in a base station be disposed in remote radio frequency units by using optical fibers and separately deployed on stations determined according to a network plan.

As shown in FIG. 1, in this embodiment of the present invention, the network device is a TRP as an example for description. For example, a TRP 1, a TRP 2, and a TRP 3 form a TRPG 1, namely, a first network device group; a TRP 4, a TRP 5, and a TRP 6 form a TRPG 2, namely, a second network device group; and a TRP 7, a TRP 8, and a TRP 9 form a TRPG 3, namely, a third network device group. The network device group includes a plurality of network devices that have correlations, or is a virtual cell or a super cell. The virtual cell or the super cell includes one or more TRPs, and the correlation means adjacency or belonging to a same type according to a predefined rule. It should be noted that both a quantity of network devices and a quantity of network devices included in one network device group are examples for description, and are merely intended for ease of description, but do not impose a limitation on the present invention.

Figure 2:
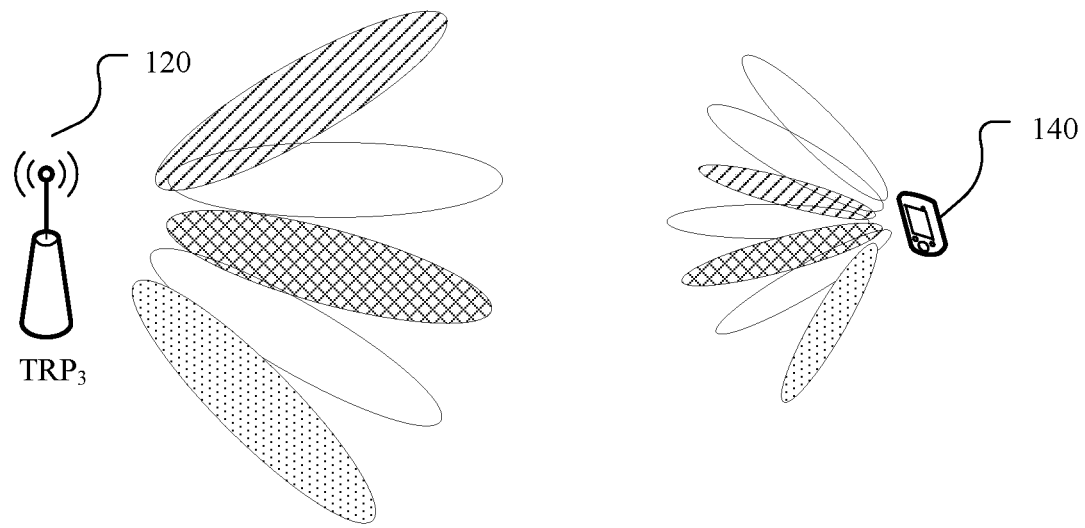
FIG. 2 is a schematic diagram of a scenario in which beam transmission is performed between a terminal and one network device according to an embodiment of the present invention.
Figure 3:
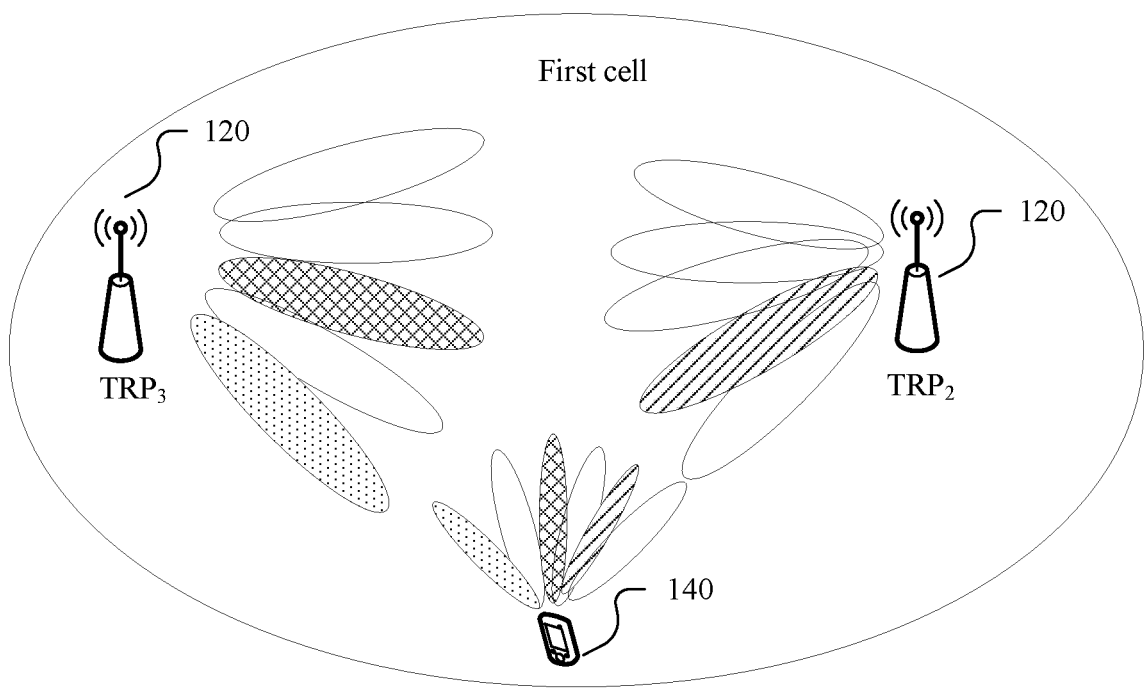
FIG. 3 is a schematic diagram of a scenario in which beam transmission is performed between a terminal and different network devices according to an embodiment of the present invention.
Figure 4:
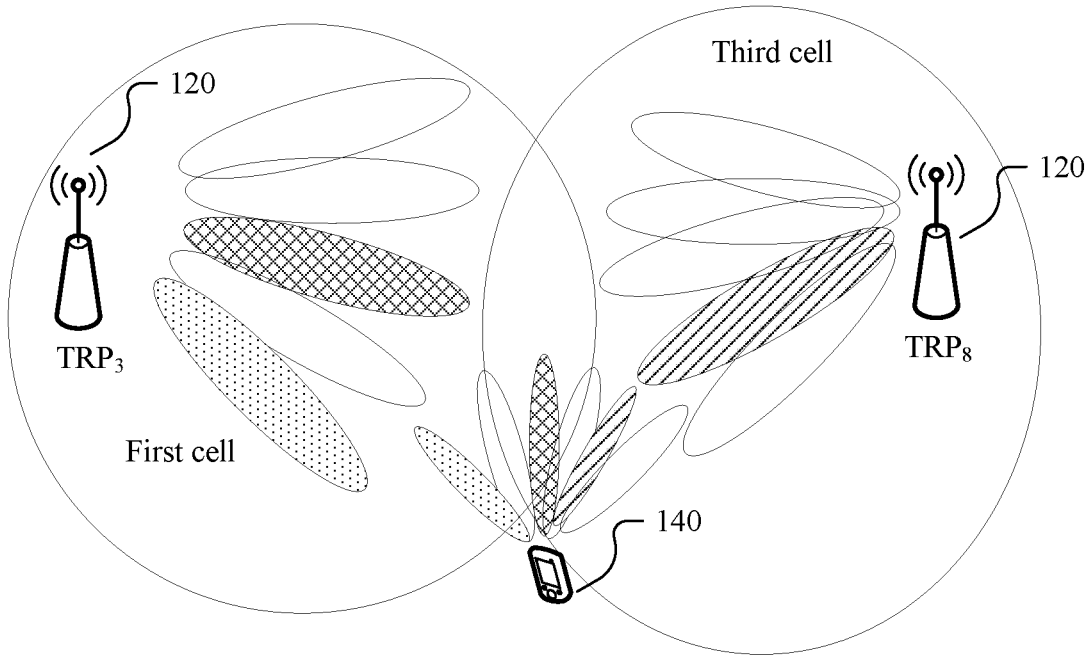
FIG. 4 is a schematic diagram of a scenario in which beam link is performed between a terminal and network devices that belong to different network device groups according to an embodiment of the present invention.

A cell or a small cell may be covered by a plurality of narrow high-gain beams (beam). Rotation patterns of different beams may overlap, to provide stable coverage for, for example, a common control channel in a whole cell region. There may be tens of to hundreds of beams that not only cover the cell region in a horizontal direction, but also cover the cell region in a vertical direction. When user equipment 140 moves in a cell or between cells, the user equipment may support at least two beams. When the user equipment has a capability of supporting both a plurality of transmit beams and a plurality of receive beams, the user equipment may be connected to a same TRP, different TRPs in a same TRPG or different TRPs that belong to different TRPGs. Understanding is obtained with reference to FIG. 1 to FIG. 4. FIG. 2 is a schematic diagram of a scenario in which beam link is performed between user equipment and one network device. FIG. 3 is a schematic diagram of a scenario in which beam link is performed between user equipment and different network devices in a network device group. FIG. 4 is a schematic diagram of a scenario in which link is performed between user equipment and network devices that belong to different network device groups. It should be noted that the user equipment may communicate with one or more core networks by using a radio access network (radio access network, RAN for short). The user equipment may be (user equipment, UE for short), access user equipment, a subscriber unit, a subscriber station, a mobile station, a mobile console, a remote station, remote user equipment, a mobile device, a wireless communications device, a user agent, or a user apparatus. The access user equipment may be a cellular phone, a cordless phone, a Session Initiation Protocol (Session Initiation Protocol, SIP for short) phone, a personal digital assistant (personal digital assistant, PDA for short), a handheld device having a wireless communication function, a computing device, another processing device connected to a wireless modem, an in-vehicle device, a wearable device, user equipment in a future 5G network, or the like.

Figure 5:
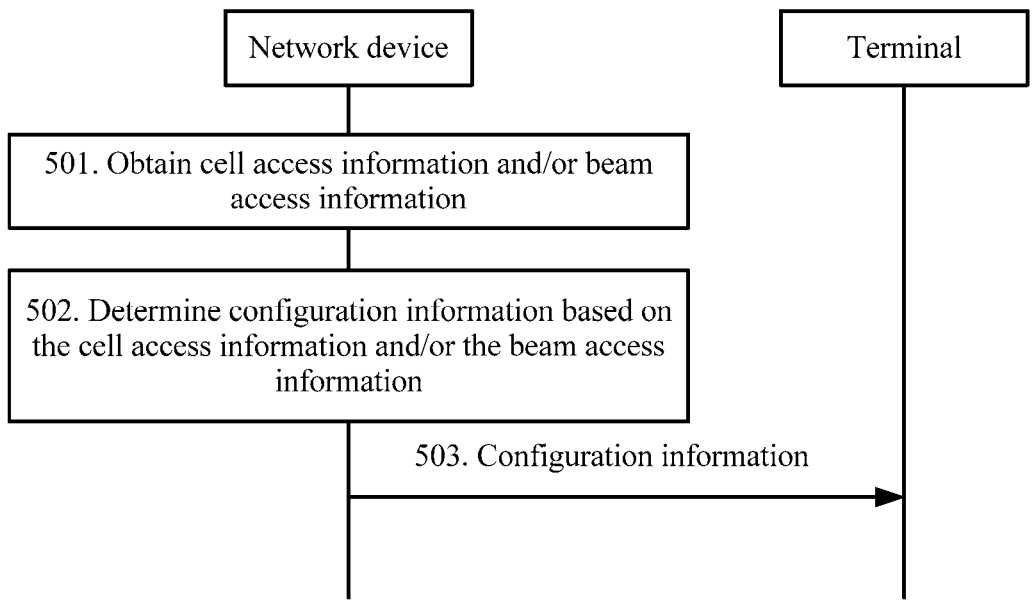
FIG. 5 is a schematic diagram of a terminal configuration method according to an embodiment of the present invention.

Referring to FIG. 5, an embodiment of a terminal configuration method provided in the present invention includes the following steps.

Step 501: A network device obtains first information and/or second information, where the first information is cell access information, and the second information is beam access information.

In this embodiment, the network device may be a base station or a TRP. The network device may be a primary TRP or a secondary TRP. Both the primary TRP and the secondary TRP are serving TRPs of user equipment. The primary TRP is a TRP first connected to the user equipment or a TRP connected to the user equipment as a primary or important communication link in TRPs connected to the user equipment. A cell is a 5G cell or may be referred to as a new radio cell.

The cell access information is cell information of a historical cell accessed by a terminal under a configuration condition. The network device may obtain one or more pieces of cell access information. Each piece of cell access information may include a cell identifier and/or a residence time of the terminal in a cell, and may further include other cell information such as a cell type, cell capability information, power of a cell-specific reference signal, and cell measurement information. Specifically, a cell type or cell capability information of each cell may be sent by a network device in a historical cell to the terminal and reported by the terminal to the network device, or obtained by the network device from a surrounding network device, a core network device, or a central controller based on a cell identifier of a historical cell.

The beam access information is beam information of a historical cell accessed by the terminal under a configuration condition. The network device may obtain beam access information of one or more cells. Each piece of beam access information may include a beam identifier and/or a residence time of the terminal in a beam, and may further include other beam information of a cell, such as a beam type, a beam width, or a beam coverage area.

The network device may obtain the first information and/or the second information from the terminal, or may obtain the first information and/or the second information from a surrounding network device, a core network device, or a central controller.

It should be noted that when the terminal performs cell access, the access is camping, cell selection, cell reselection, or cell handover. When the terminal performs beam access, the access is a beam change, and the beam change is also referred to as beam switching. In addition, the access may further be link increase or link switching. The beam change may include beam increase or beam switching.

Step 502: The network device determines configuration information based on the first information and/or the second information.

When the network device obtains the cell access information, the configuration information is cell reselection configuration information and/or cell handover configuration information. When the network device obtains the beam access information, the configuration information is beam configuration information.

The cell reselection configuration information includes a cell reselection threshold and at least one of the following: a cell reselection hysteresis parameter, cell reselection hysteresis duration, and a cell reselection mobile-state scale factor.

The cell handover configuration information includes a cell handover threshold and at least one of the following: a cell handover hysteresis parameter, a cell handover triggering time, and a cell handover mobile-state scale factor.

The beam change configuration information includes a beam change threshold and at least one of the following: a beam change hysteresis parameter, beam change hysteresis duration, a beam change mobile-state scale factor, a beam change triggering time, a beam change evaluation time, and an additional evaluation time.

In an optional embodiment, step 502 may be specifically: the network device determines a mobility status of the terminal based on the first information and/or the second information, and determines the configuration information based on the mobility status of the terminal.

Step 503: The network device sends the configuration information to a terminal.

After receiving the configuration information, the terminal may perform cell reselection, cell handover, or beam changing based on the configuration information and the mobility status. Details are as follows:

When the terminal performs cell reselection, the network device may send, to the terminal, the cell reselection threshold and at least one of the following: a cell reselection hysteresis parameter $Q_{hyst}$, a cell reselection hysteresis duration $Treselection_{RAT}$, and a cell reselection mobile-state scale factor (sf-high or sf-medium). A cell reselection threshold $Q_{hyst}$ is a cell reselection threshold in a normal-speed state. The terminal may calculate a cell reselection hysteresis parameter and cell reselection hysteresis duration in a current state based on the mobility status of the terminal. For example, in a medium-speed state, the cell reselection hysteresis parameter of the terminal is $Q_{hyst}$+sf-medium, and the cell reselection hysteresis duration is $Treselection_{RAT} \times$ sf-medium. In a high-speed state, the cell reselection hysteresis parameter of the terminal is $Q_{hyst}$+sf-high, and the cell reselection hysteresis duration is $Treselection_{RAT} \times$ sf-high. After the terminal obtains channel quality of a neighboring cell, if the channel quality of the neighboring cell is higher than or equal to a sum of the cell reselection threshold and a cell reselection hysteresis parameter in a current state, the terminal uses the neighboring cell as a reselected cell.

When the terminal performs cell handover, the network device may send, to the terminal, the cell handover threshold and at least one of the following: a cell handover hysteresis parameter $Q_{hyst}$, a cell handover triggering time timeToTrigger, and a cell handover mobile-state scale factor (sf-high or sf-medium). For example, in a medium-speed state, the cell handover hysteresis parameter of the terminal is $Q_{hyst}$+sf-medium, and the cell handover hysteresis duration is Treselection$_{RAT}$×sf-medium. In a high-speed state, the cell handover hysteresis parameter of the terminal is $Q_{hyst}$+sf-high, and the cell handover hysteresis duration is Treselection$_{RAT}$×sf-high. After the terminal obtains channel quality of a neighboring cell, if the channel quality of the neighboring cell is higher than or equal to a sum of the cell handover threshold and a cell handover hysteresis parameter in a current state, the terminal uses the neighboring cell as a cell to which the terminal is to be handed over.

When the terminal performs beam changing, the network device may send, to the terminal, the beam change threshold and at least one of the following: the beam change hysteresis parameter, the beam change hysteresis duration, the beam change mobile-state scale factor, the beam change triggering time, the beam change evaluation time, and the additional evaluation time. In different mobility states, a manner for setting the beam change hysteresis parameter and the beam change hysteresis duration is similar to a manner for setting the cell reselection hysteresis parameter and the cell reselection hysteresis duration or a manner for setting the cell handover hysteresis parameter and the cell handover hysteresis duration. Details are not described herein.

Based on the embodiment shown in FIG. 5, in an optional embodiment of the present invention, before step 501, the method further includes: sending, by the network device, third information, where the third information is used to instruct the terminal to send the first information and/or the second information.

Further, in another optional embodiment of the present invention, before the sending, by the network device, third information, the method may further include: receiving, by the network device, fourth information sent by the terminal, where the fourth information is capability information of the terminal for obtaining the first information and/or the second information. Specifically, if the terminal has a capability of obtaining the first information and/or the second information, the terminal reports the fourth information to the network device. The network device may send the third information to the terminal based on the fourth information, to instruct the terminal to report the first information and/or the second information, so as to deliver the configuration information to the terminal.

Based on different information obtained by the network device, the network device may determine the mobility status of the terminal by using a plurality of methods. Details are described below separately.

First, the network device determines the mobility status of the terminal based on a quantity of cell handover times.

Figure 6:
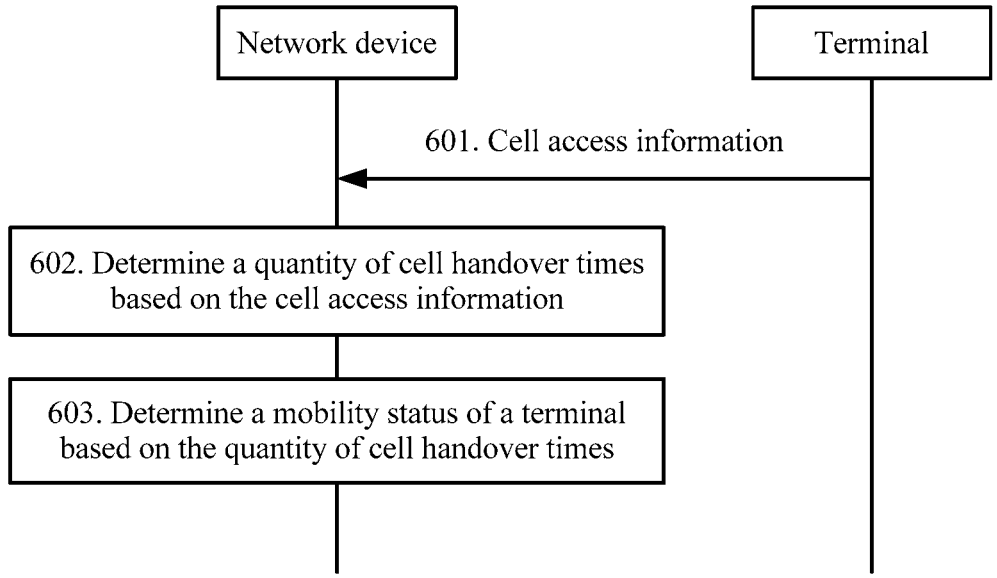
FIG. 6 is a schematic diagram of a method for determining mobility of a terminal according to an embodiment of the present invention.

Referring to FIG. 6, an embodiment of a method for determining mobility of a terminal provided in the present invention includes the following steps:

Step 601: A network device receives cell access information sent by a terminal.

In this embodiment, the terminal may obtain cell access information of a historical cell accessed in a configured time segment, or may obtain cell access information of a specified quantity of historical cells. Alternatively, the terminal may obtain cell access information of a historical cell accessed in a first state, cell access information of a historical cell accessed in a second state, or cell access information of a historical cell accessed in a third state. After obtaining the cell access information of the historical cell, the terminal reports the cell access information to the network device.

Each piece of cell access information may include a cell identifier and/or a residence time of the terminal in a cell, and may further include other cell information such as power of a cell-specific reference signal and cell measurement information.

It should be noted that the network device may alternatively obtain the cell access information of the terminal in the historical cell from a surrounding network device, a core network device, or a central controller.

Step 602: The network device determines a quantity of cell handover times based on the cell access information.

Step 603: The network device determines a mobility status of the terminal based on the quantity of cell handover times.

It can be learned from step 602 and step 603 that the network device may determine the quantity of cell handover times based on a quantity of pieces of cell access information, and then determine the mobility status of the terminal based on a preset correspondence between a quantity of cell handover times and a mobility status.

For example, a correspondence between a quantity of cell handover times and a mobility status may be shown in Table 1.

TABLE 1

| Quantity of cell handover times | Mobility status |
|---|---|
| i < 3 | Normal speed |
| 3 ≤ i ≤ 6 | Medium speed |
| 6 < i ≤ 10 | High speed |
| i > 10 | Super speed |

If the network device obtains three cell identifiers, the network device may determine that the quantity of cell handover times is 3, and then determine that the mobility status of the terminal corresponds to a medium speed. Alternatively, the network device obtains six residence moments of the terminal in cells, the network device may determine that the quantity of cell handover times is 6, and then determine that the mobility status of the terminal corresponds to a medium speed.

The following describes in detail setting of the correspondence between a quantity of cell handover times and a mobility status.

The network device may configure a plurality of cell handover thresholds and/or a plurality of mobility states. The cell handover threshold includes at least one of a first threshold, a second threshold, or a third threshold. The plurality of mobility states include at least one of a first mobility state, a second mobility state, or a third mobility state. Further, the network device may set a plurality of intervals based on at least one of the first threshold, the second threshold, or the third threshold. The intervals are in a one-to-one correspondence with the mobility states. Specifically, the first threshold may be 3, the second threshold may be 6, and the third threshold may be 10, as shown in Table 1. The first mobility state may correspond to a high speed, the second mobility state may correspond to a medium speed, and the third mobility state may correspond to a normal speed. Alternatively, the first mobility state corresponds to a super speed, the second mobility state corresponds to a high speed, and the third mobility state corresponds to a normal speed. It may be understood that the foregoing values or speeds are merely examples and constitute no limitation on threshold values.

Second, the network device determines the mobility status of the terminal based on a mobility weight in each cell.

Coverage areas of base stations in an LTE system are basically the same. Therefore, a method for estimating mobility of a terminal based on a quantity of handover times can be implemented in the prior art. However, in LTE-A, different virtual cells include different quantities of TRPs or different TRP coverage areas. Consequently, coverage areas of virtual cells differ greatly. When the mobile terminal is handed over between a cell and a virtual cell, or handed over between different virtual cells, an actual mobility status of the terminal cannot be accurately estimated by using the method for estimating mobility based on a quantity of handover times in the prior art. To address this problem, the present invention provides a new method for estimating mobility of a terminal. A core idea of the method is to separately set a weight for a cell or a virtual cell accessed by a terminal, so as to indicate a quantity of area change times of the terminal based on a sum of area weights, and then estimate a mobility status of the terminal based on the quantity of area change times.

Figure 7:
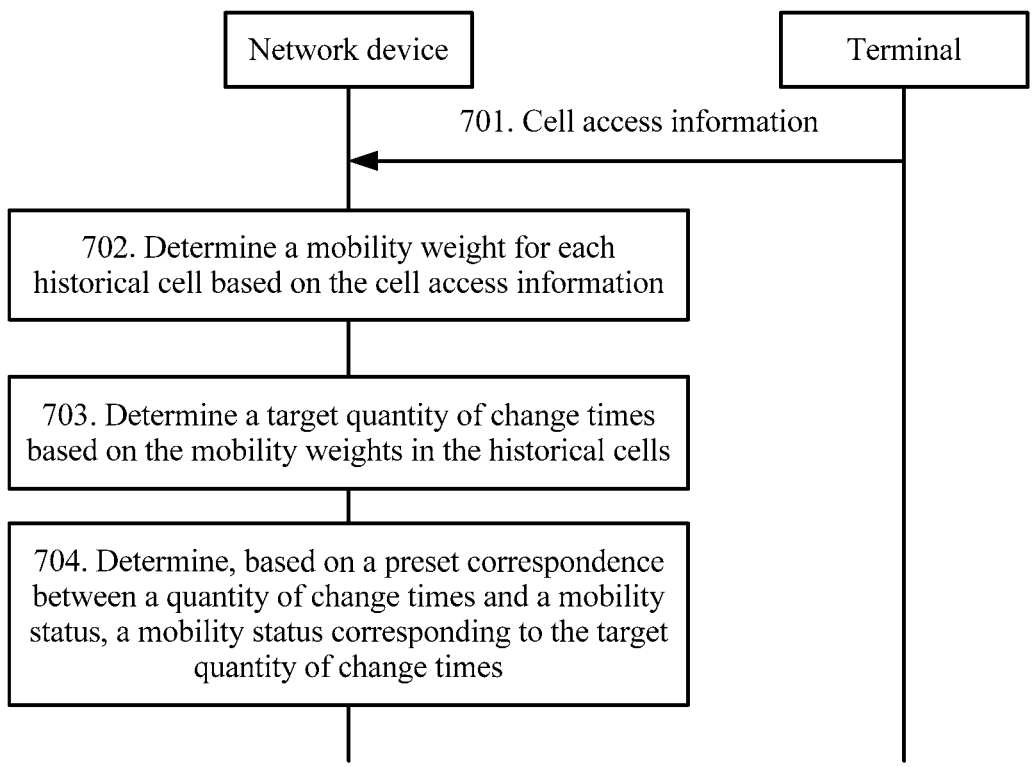
FIG. 7 is a schematic diagram of a method for determining mobility of a terminal according to an embodiment of the present invention.

Referring to FIG. 7, another embodiment of a method for determining mobility of a terminal provided in the present invention includes the following steps.

Step 701: A network device receives cell access information sent by a terminal.

Step 702: Determine a mobility weight for each historical cell based on the cell access information.

In this embodiment, the network device may set a mobility weight for each cell by using a plurality types of information (such as a cell type, cell capability information, and a quantity of beams in the cell). Details are described below separately.

(1) The network device determines a mobility weight in a cell based on a cell type.

In an optional embodiment, a quantity of network devices in a cell affects a cell coverage area. Therefore, based on the quantity of network devices in the cell, a cell type may be set, and a corresponding mobility weight may be set. When the terminal passes the cell, a network device to which the cell belongs may send the cell type to the terminal. For example, a correspondence between a cell type and a mobility weight may be shown in Table 2.

TABLE 2

| Cell type | Network device in a cell | Mobility weight |
|---|---|---|
| Type 1 | Macro base station | 1 |
| Type 2 | Virtual cell (including 10 TRPs) | 1 |
| Type 3 | Virtual cell (including five TRPs) | 0.5 |
| . . . | . . . | . . . |
| Type n | Small cell (including one TRP) | 0.1 |

After the terminal sends a cell type of a historical cell to the network device, the network device may determine the mobility weight for each cell based on the cell type.

In another optional embodiment, power of a network device in a cell affects a cell coverage area. Therefore, based on the power of the network device in the cell, a cell type may be set, and a corresponding mobility weight may be set. Network power may be power of a cell-specific reference signal. There is a positive correlation between the power of the cell-specific reference signal and the cell coverage area. The cell-specific reference signal may be a common reference signal (Common Reference Signal, CRS for short) or a virtual common reference signal (Virtual Common Reference Signal, VCRS for short).

For example, n thresholds are defined, and (n+1) cell types may be set based on the n thresholds. It is usually considered that the cell types may correspond to cell coverage areas with an equal size. A correspondence between a cell type, power of a cell-specific reference signal, and a mobility weight may be shown in Table 3.

TABLE 3

| Cell type | Power of a cell-specific reference signal | Mobility weight |
|---|---|---|
| Type 1 | $RS < T1$ | 0.1 |
| Type 2 | $T1 < RS < T2$ | 0.2 |
| Type 3 | $T2 < RS < T3$ | 0.3 |
| . . . | . . . | . . . |
| Type n | $T_{n-1} < RS < T_n$ | $0.1 \times n$ |

After the terminal sends a cell type of a historical cell to the network device, the network device may determine the mobility weight for each cell based on the cell type.

(2) The network device determines a mobility weight in a cell based on a quantity of beams in the cell.

In another optional embodiment, a quantity of beams in a cell affects a cell coverage area. Therefore, a mobility weight in the cell may be set based on the quantity of beams in the cell.

For example, a correspondence between a quantity of beams in a cell and a mobility weight may be shown in Table 4.

TABLE 4

| Cell identifier | Quantity of beams in a cell | Mobility weight |
|---|---|---|
| Cell 1 | 3 | 1 |
| Cell 2 | 15 | 5 |
| Cell 3 | 30 | 10 |

After the network device receives a cell identifier, sent by the terminal, of a historical cell, the network device may determine the mobility weight for each cell based on a quantity of beams in the cell.

(3) The network device determines a mobility weight in a cell based on a quantity of beams accessed by the terminal in the cell.

In another optional embodiment, the network device may obtain, from the terminal, information about a beam accessed by the terminal in a cell, where the information about the beam accessed by the terminal in the cell includes cell information and beam information, and the network device may obtain a quantity of beams accessed by the terminal in each cell. The network device may determine the mobility weight for each cell based on the quantity of beams accessed by the terminal. Specifically, there is a positive correlation between the quantity of beams and the mobility weight. A larger quantity results in a larger mobility weight, and a smaller quantity results in a smaller mobility weight.

(4) The network device determines a mobility weight in a cell based on a cell capability.

In an optional embodiment, a beamforming capability and/or a beam width and/or a beam coverage area of a network device in a cell affects a coverage area of the network device. Therefore, based on a quantity of network devices in the cell and/or a beamforming capability, a beam width, or a beam coverage area of a network device to which the cell belongs, a cell capability may be differentiated, and a corresponding mobility weight may be set. Generally, there are positive correlations between the beamforming capability and a network device capability, between the beam width and the network device capability, and between the beam coverage area and the network device capability, and there are positive correlations between the quantity of network devices and the cell capability and between the network device capability and the cell capability. When the terminal passes the cell, a network device in the cell may send cell capability information to the terminal.

After the terminal reports cell capability information of a historical cell to the network device, the network device may determine the mobility weight for each cell based on the cell capability information.

It may be understood that in the present invention, the mobility weight of the terminal may alternatively be determined based on a combination of the cell type, the cell capability information, the quantity of beams in the cell, or the quantity of beams accessed by the terminal in the cell.

Step 703: The network device determines a target quantity of change times based on the mobility weights in the historical cells.

In an optional embodiment, after separately obtaining the mobility weights in the historical cells, the network device may calculate a sum of the mobility weights in the cells, and use the sum of the mobility weights as the target quantity of change times.

Step 704: The network device determines, based on a preset correspondence between a quantity of change times and a mobility status, a mobility status corresponding to the target quantity of change times.

It should be noted that a manner for setting the correspondence between a quantity of change times and a mobility status corresponds to a manner for setting a mobility weight in a cell by the network device. When the network device sets the cell mobility weight based on the cell type, the network device sets the correspondence between a quantity of change times and a mobility status based on the cell type. When the network device sets the mobility weight in the cell based on the cell capability, the network device sets the correspondence between a quantity of change times and a mobility status based on the cell capability.

Third, the network device determines the mobility status of the terminal based on a quantity of beam switching times.

Figure 8:
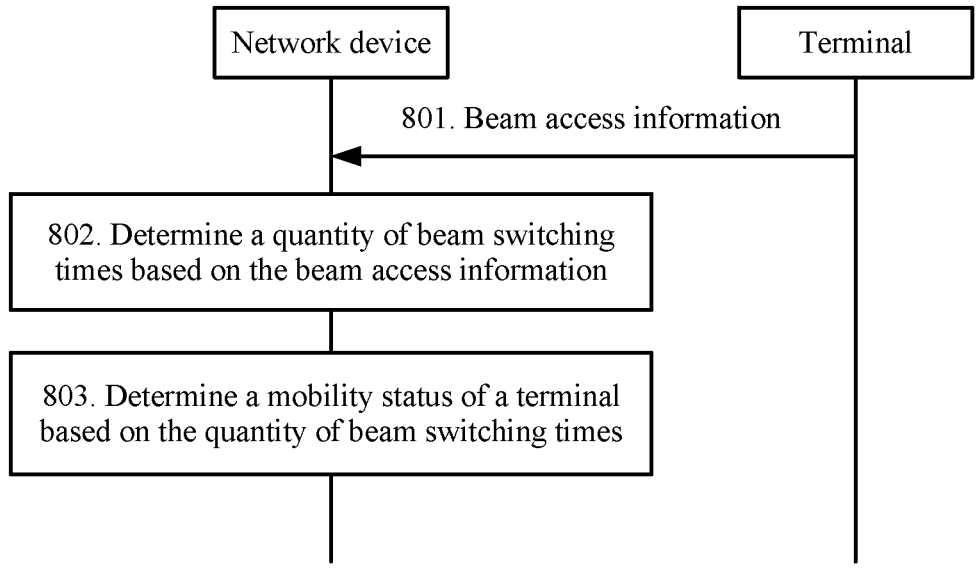
FIG. 8 is another schematic diagram of a method for determining mobility of a terminal according to an embodiment of the present invention.

Referring to FIG. 8, another embodiment of a method for determining mobility of a terminal provided in the present invention includes the following steps:

Step 801: A network device obtains beam access information sent by a terminal.

In this embodiment, the terminal may obtain historical beam information accessed by the terminal in a configured time segment, or may obtain a specified quantity of historical beam information. The terminal may alternatively obtain historical beam information accessed in a first state, historical beam information accessed in a second state, or historical beam information accessed in a third state. After obtaining the beam access information of the historical cell, the terminal reports the cell access information to the network device.

The beam access information is beam information obtained when the terminal performs beam changing. Each piece of beam access information may include a beam identifier and/or a residence time of the terminal in a beam, and may further include other beam information such as power of a beam reference signal and beam measurement information.

Step 802: The network device determines a quantity of beam switching times based on the beam access information.

Step 803: The network device determines a mobility status of the terminal based on the quantity of beam switching times.

It can be learned from step 802 and step 803 that the network device may determine the quantity of beam switching times based on a quantity of pieces of beam access information, and then determine the mobility status of the terminal based on a preset correspondence between a quantity of beam switching times and a mobility status.

For example, a correspondence between a quantity of beam switching times and a mobility status may be shown in Table 5.

TABLE 5

| Quantity of beam switching times | Mobility status |
| --- | --- |
| i < 30 | Normal speed |
| 30 ≤ i ≤ 60 | Medium speed |
| 60 < i ≤ 100 | High speed |
| i > 100 | Super speed |

If the network device obtains 30 beam identifiers, the network device may determine that the quantity of beam switching times is 30, and then determine that the mobility status of the terminal corresponds to a medium speed. Alternatively, the network device obtains 60 residence moments of the terminal in beams, the network device may determine that the quantity of beam switching times is 60, and then determine that the mobility status of the terminal corresponds to a medium speed.

The following describes in detail setting of the correspondence between a quantity of beam switching times and a mobility status.

The network device configures a plurality of beam switching thresholds and/or a plurality of mobility states based on the beam access information. The beam switching threshold includes at least one of a first threshold, a second threshold, or a third threshold. The mobility status includes at least one of a first mobility state, a second mobility state, or a third mobility state. After the configuration, the network device may send the beam switching thresholds and/or the mobility states to the terminal.

Specifically, if a quantity of beam access times is greater than or equal to the first threshold, the mobility status of the terminal is the first mobility state; if a quantity of beam access times is greater than or equal to the second threshold and less than the first threshold, the mobility status of the terminal is the second mobility state; or if a quantity of beam access times is greater than or equal to the third threshold and less than the second threshold, the mobility status of the terminal is the third mobility state. The first mobility state may correspond to a high speed, the second mobility state may correspond to a medium speed, and the third mobility state may correspond to a normal speed.

Fourth, the network device determines the mobility status of the terminal based on a moving speed in a cell.

Figure 9:
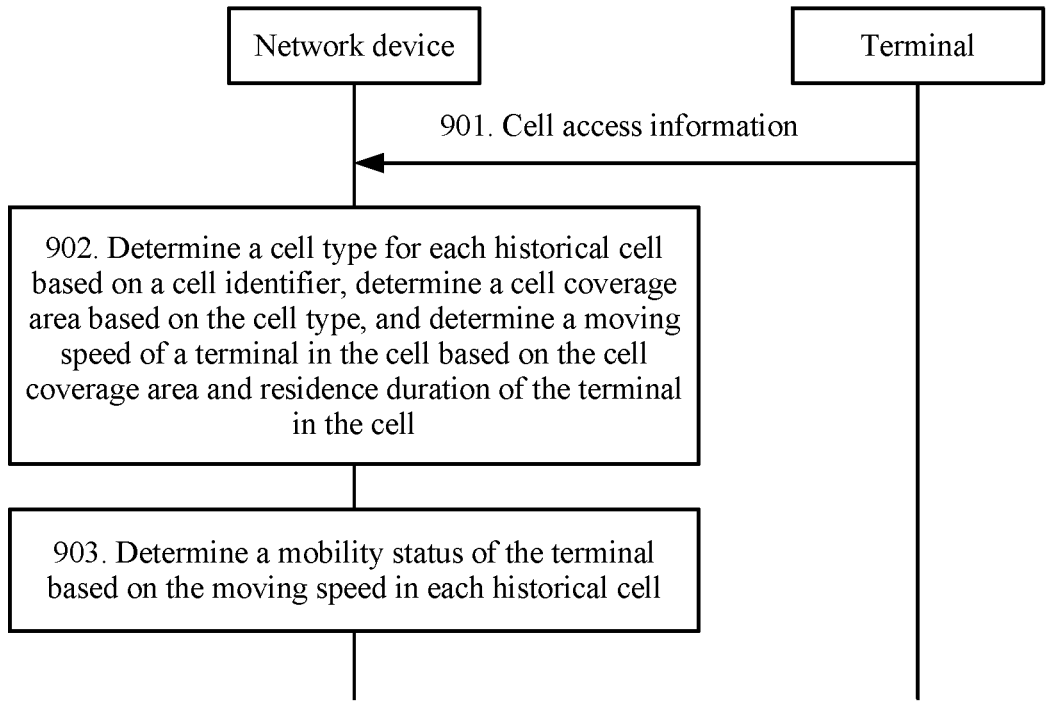
FIG. 9 is another schematic diagram of a method for determining mobility of a terminal according to an embodiment of the present invention.

Referring to FIG. 9, another embodiment of a method for determining mobility of a terminal provided in the present invention includes the following steps.

Step 901: A network device receives cell access information sent by a terminal.

In this embodiment, the terminal reports cell access information of a historical cell to the network device. Each piece of cell access information includes at least a cell identifier and residence duration of the terminal in a cell.

Step 902: The network device determines a cell type for each historical cell based on a cell identifier, determines a cell coverage area based on the cell type, and determines a moving speed of the terminal in the cell based on the cell coverage area and residence duration of the terminal in the cell.

In an optional embodiment, the network device determines the cell type for each historical cell based on the cell identifier, determines the cell coverage area based on the cell type, and determines the moving speed of the terminal in the cell based on the cell coverage area and the residence duration of the terminal in the cell. Specifically, the network device may select and set a cell diameter or a path less than a diameter as a route of the terminal based on the cell coverage area, and then calculate the moving speed of the terminal in the cell based on the route and the residence duration (also referred to as camp duration) of the terminal in the cell.

Step 903: The network device determines a mobility status of the terminal based on the moving speed in each historical cell.

In this embodiment, after the terminal reports cell access information of n cells, the network device may separately determine moving speeds in the n cells, and then obtain an arithmetic average value or a weighted average value of the moving speeds in the n cells. In this way, the network device can obtain, through calculation, the moving speed of the terminal in the historical cell, and then determine the mobility status of the terminal based on a preset correspondence between a moving speed and a mobility status.

The foregoing describes, from a network device side, the terminal configuration method provided in the present invention. The following describes, from a terminal side, a method for determining mobility of a terminal provided in the present invention.

Figure 10:
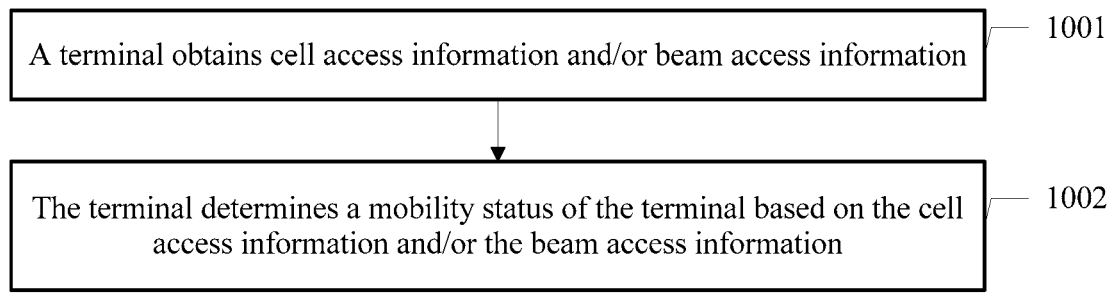
FIG. 10 is another schematic diagram of a method for determining mobility of a terminal according to an embodiment of the present invention.

Referring to FIG. 10, another embodiment of a method for determining mobility of a terminal provided in the present invention includes the following steps:

Step 1001: A terminal obtains first information and/or second information, where the first information is cell access information, and the second information is beam access information.

Step 1002: The terminal determines a mobility status of the terminal based on the first information and/or the second information.

Based on the embodiment shown in FIG. 10, in an optional embodiment, the terminal obtains cell access information of a historical cell, determines a quantity of cell handover times based on the cell access information of the historical cell, and determines the mobility status of the terminal based on the quantity of cell handover times.

Based on the embodiment shown in FIG. 10, in another optional embodiment, the terminal obtains cell access information of a historical cell, separately determines a mobility weight in the cell based on the cell access information of the historical cell, determines a target quantity of change times based on the mobility weights in the historical cells, and determines, based on a preset correspondence between a quantity of change times and a mobility status, a mobility status corresponding to the target quantity of change times. Specifically, the terminal may determine the mobility weight in the cell based on a cell type, cell capability information, a quantity of beams in the cell, or a quantity of beams accessed by the terminal. Further, the terminal may determine the cell type based on a quantity of network devices or power of a network device.

Based on the embodiment shown in FIG. 10, in another optional embodiment, the terminal obtains historical beam information, determines a quantity of beam switching times based on the beam access information, and determines the mobility status based on the quantity of beam switching times.

Based on the embodiment shown in FIG. 10, in another optional embodiment, the terminal may report the mobility status to the network device. In another optional embodiment, before the terminal reports the mobility status to the network device, the terminal may receive a mobility status reporting instruction sent by the network device, where the mobility status reporting instruction is used to instruct the terminal to report the mobility status to the network device.

Based on the embodiment shown in FIG. 10, in another optional embodiment, the terminal obtains power of a cell-specific reference signal of a historical cell, and the terminal determines a mobility weight for each cell based on the power of the cell-specific reference signal, and then determines the mobility status of the terminal based on the mobility weights in the historical cells.

In an optional embodiment, the network device broadcasts a cell type, cell capability information, or a weighting factor obtained depending on a cell type group or a cell capability group. The terminal obtains the weighting factor through preconfiguration, or obtains the weighting factor broadcast by the network device.

A process in which the terminal determines the mobility status of the terminal based on the first information and/or the second information in the embodiment or the optional embodiments shown in FIG. 10 is similar to a process in which the network device determines the mobility status of the terminal based on the first information and/or the second information in the embodiment or the optional embodiments shown in FIG. 5 or in the embodiments or the optional embodiments shown in FIG. 6 to FIG. 9. Details are not described herein again.

In an actual application, in a connected state, a mobility type may be differentiated based on a serving cell and/or a beam, and a neighboring cell and/or a beam. The following describes in detail a process in which a network device determines configuration information based on a mobility status and/or a mobility type of a terminal.

Figure 11:
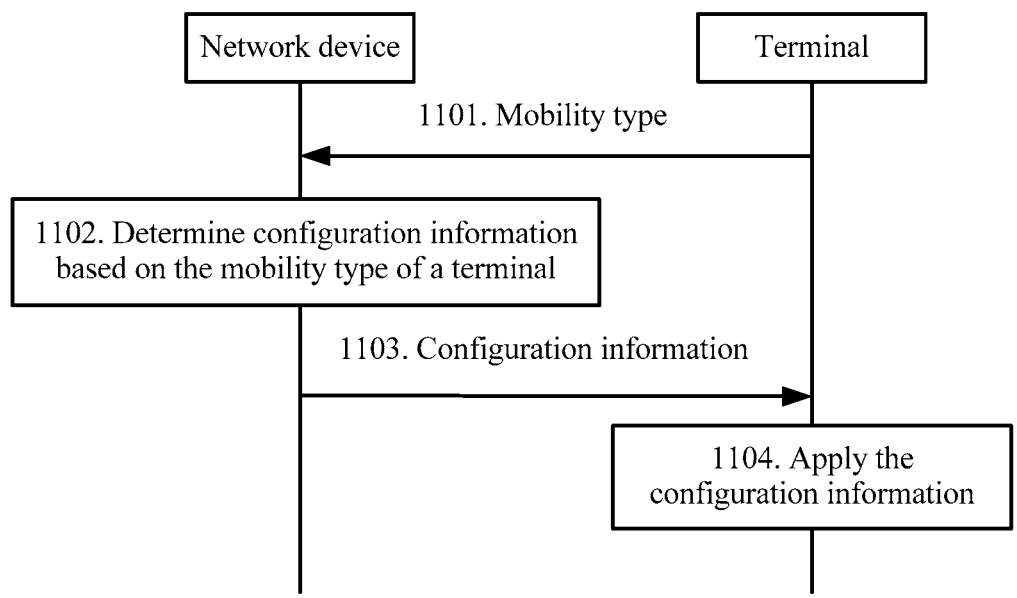
FIG. 11 is another schematic diagram of a terminal configuration method according to an embodiment of the present invention.

Referring to FIG. 11, another embodiment of a terminal configuration method provided in the present invention includes the following steps:

Step 1101: A network device obtains a mobility type of a terminal.

In this embodiment, three mobility types may be differentiated: For a first mobility type, the terminal is switched from a beam of a network device A to a beam of a network device B, where the network device A and the network device B belong to a same TRPG. For a second mobility type, the terminal is switched from a network device group A to a network device group B, or the terminal is switched from a beam of a network device group A to a beam of a network device group B. For a third mobility type, the terminal is switched from a beam of a network device A to another beam of the network device A. Corresponding configuration information may be set for each mobility type. For example, first configuration information corresponds to the first mobility type, second configuration information corresponds to the second mobility type, and third configuration information corresponds to the third mobility type.

Step 1102: The network device determines configuration information based on the mobility type of the terminal.

Step 1103: The network device sends the configuration information to the terminal.

Step 1104: The terminal applies the configuration information.

Specifically, the terminal applies the first configuration information to the first mobility type, the terminal applies the second configuration information to the second mobility type, and the terminal applies the third configuration information to the third mobility type.

Based on the embodiment shown in FIG. 11, in an optional embodiment of the present invention, the network device may obtain cell access information and/or beam access information from the terminal. Step 1101 may be specifically: the network device obtains a mobility status and/or the mobility type of the terminal based on the cell access information and/or the beam access information.

Specifically, the terminal reports current beam information and target beam information to the network device. The network device determines a mobility type based on the current beam information and the target beam information, and determines configuration information corresponding to the mobility type, and the network device sends the configuration information to the terminal. The beam information may be a beam identifier, and the beam identifier may be in a format of a TRPG/TRP/beam.

For example, if the current beam information is a TRPG 1/TRP 2/beam 3, and the target beam information is a TRPG 2/TRP 1/beam 1, the network device may determine, based on the TRPG 1 in a current beam and the TRPG 2 to which a target beam belongs, that the mobility type of the terminal is the second mobility type, and further determine that the configuration information of the terminal should be the second configuration information. The network device may send the second configuration information to the terminal.

Based on the embodiment or the optional embodiment shown in FIG. 11, in another optional embodiment of the present invention, before the network device obtains the mobility status and/or the mobility type of the terminal, the network device instructs the terminal to report the mobility status and/or the mobility type, and the network device obtains the mobility status and/or the mobility type of the terminal from the terminal.

Based on the embodiment or the optional embodiments shown in FIG. 11, in another optional embodiment of the present invention, the network device instructs the terminal to periodically trigger an event or instructs the terminal to perform reporting when the terminal is in a connected state.

Based on the embodiment or the optional embodiments shown in FIG. 11, in another optional embodiment of the present invention, the configuration information is sent by the network device to the terminal by using physical layer signaling, MAC layer signaling, or RRC layer signaling.

Figure 12:
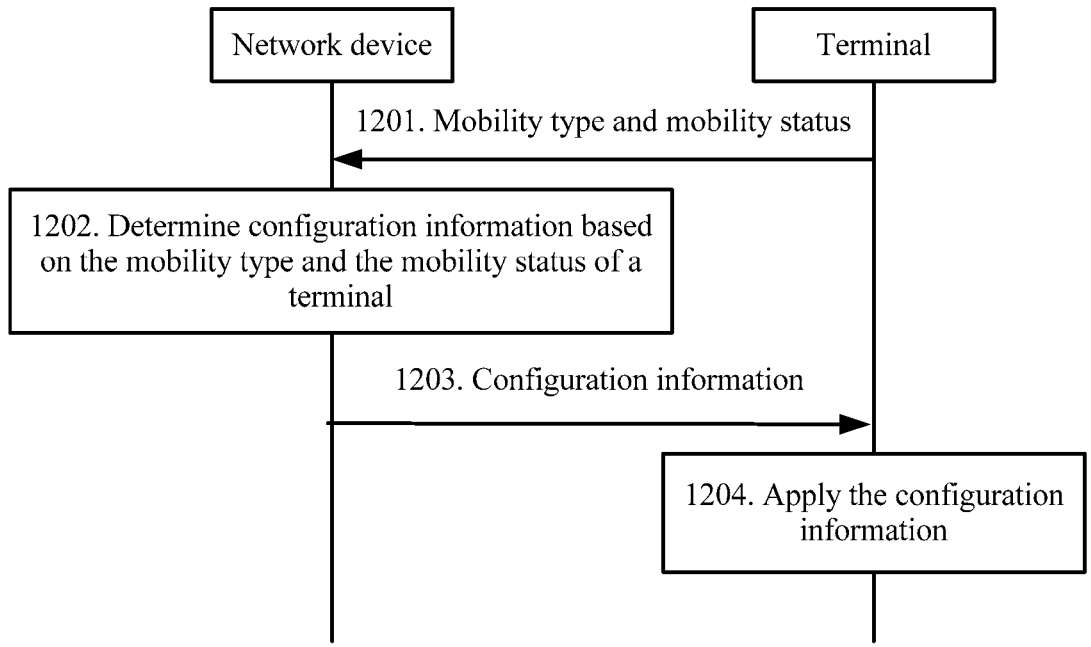
FIG. 12 is another schematic diagram of a terminal configuration method according to an embodiment of the present invention.

Referring to FIG. 12, an embodiment of a terminal configuration method in an embodiment of the present invention includes the following steps.

Step 1201: A network device receives a mobility status and a mobility type that are sent by a terminal.

In this embodiment, three mobility types may be set: a first mobility type, a second mobility type, and a third mobility type, and three mobility states may be set: a high speed, a medium speed, and a normal speed. Nine types of configuration information may be preconfigured based on the mobility types and the mobility states.

For example, a correspondence between a mobility type, a mobility status, and configuration information may be shown in Table 6.

TABLE 6

| Mobility type | Mobility status | Configuration information |
|---|---|---|
| First mobility type | High speed | First beam threshold, beam change hysteresis parameter, beam change hysteresis duration, and high-speed scale factor |
| First mobility type | Medium speed | First beam threshold, beam change hysteresis parameter, beam change hysteresis duration, and medium-speed scale factor |
| First mobility type | Normal speed | First beam threshold, beam change hysteresis parameter, and beam change hysteresis duration |
| Second mobility type | High speed | Cell change threshold, cell change hysteresis parameter, cell change hysteresis duration, and cell change mobile-state scale factor |
| Second mobility type | Medium speed | Cell change hysteresis parameter, cell change hysteresis duration, and cell change mobile-state scale factor |
| Second mobility type | Normal speed | Cell change hysteresis parameter, cell change hysteresis duration, and cell change mobile-state scale factor |
| Third mobility type | High speed | Second beam threshold, beam change hysteresis parameter, beam change hysteresis duration, and high-speed scale factor |
| Third mobility type | Medium speed | Second beam threshold, beam change hysteresis parameter, beam change hysteresis duration, and medium-speed scale factor |
| Third mobility type | Normal speed | Second beam threshold, beam change hysteresis parameter, and beam change hysteresis duration |

In an optional embodiment, the first mobility type corresponds to first configuration information, and the first configuration information includes a beam change threshold and at least one of the following: a beam change hysteresis parameter, beam change hysteresis duration, a beam change mobile-state scale factor, a beam change triggering time, a beam change evaluation time, and an additional evaluation time. A beam change is beam increase or beam switching. The second mobility type corresponds to second configuration information, and the second configuration information includes a cell reselection threshold, a cell reselection hysteresis parameter, cell reselection hysteresis duration, and cell reselection mobile-state scale factor, and/or a cell handover threshold, a cell handover hysteresis parameter, a cell handover triggering time, and a cell handover mobile-state scale factor. The third mobility type corresponds to third configuration information, and the third configuration information includes a beam change threshold and at least one of the following: a beam change hysteresis parameter, beam change hysteresis duration, a beam change mobile-state scale factor, a beam change triggering time, a beam change evaluation time, and an additional evaluation time.

Step 1202: The network device determines configuration information based on the mobility status and the mobility type.

Step 1203: The network device sends the configuration information to the terminal.

Step 1204: The terminal applies the configuration information.

Based on the embodiment shown in FIG. 12, in another optional embodiment of the present invention, when the mobility type of the terminal is the first mobility type or the third mobility type, the network device obtains first information, and/or second information, and/or the mobility status, and/or the mobility type from the terminal by using physical layer signaling or Media Access Control (Media Access Control, MAC for short) layer signaling; or when the mobility type of the terminal is the second mobility type, the network device obtains first information, and/or second information, and/or the mobility status, and/or the mobility type from the terminal by using physical layer signaling, MAC layer signaling, or radio resource control (Radio Resource Control, RRC for short) layer signaling. The first information is cell access information, and the second information is beam access information.

Based on the embodiment or the optional embodiments shown in FIG. 12, in another optional embodiment of the present invention, before the network device obtains the mobility status and/or the mobility type of the terminal, the network device instructs the terminal to report the mobility status and/or the mobility type, and the network device obtains the mobility status and/or the mobility type of the terminal from the terminal.

Based on the embodiment or the optional embodiments shown in FIG. 12, in another optional embodiment of the present invention, the network device instructs the terminal to periodically trigger an event or instructs the terminal to perform reporting when the terminal is in a connected state.

Based on the embodiment or the optional embodiments shown in FIG. 12, in another optional embodiment of the present invention, the configuration information is sent by the network device to the terminal by using physical layer signaling, MAC layer signaling, or RRC layer signaling.

In another optional embodiment of the present invention, the terminal reports current cell information and target cell information to the network device. The network device determines a mobility type based on the current cell information and the target cell information, and determines configuration information corresponding to the mobility type, and the network device sends the configuration information to the terminal.

In this embodiment, cell information may include a network device group identifier and a network device identifier, and a cell identifier may be in a format of a TRPG/TRP. Three mobility types may be differentiated: For a first mobility type, the terminal is switched from a beam of a network device A to a beam of a network device B, where the network device A and the network device B belong to a same TRPG. For a second mobility type, the terminal is switched from a network device group A to a network device group B, or the terminal is switched from a beam of a network device group A to a beam of a network device group B. Corresponding configuration information may be set for each mobility type. For example, first configuration information corresponds to the first mobility type, and second configuration information corresponds to the second mobility type.

A first configuration parameter includes a first beam threshold and/or at least one of the following: the beam change hysteresis parameter, the beam change hysteresis duration, and the beam change mobile-state scale factor. A second configuration parameter includes a second beam threshold and/or at least one of the following: the beam change hysteresis parameter, the beam change hysteresis duration, and the beam change mobile-state scale factor.

For example, if current beam information is a TRPG 1/TRP 2, and target beam information is a TRPG 2/TRP 1, the network device may determine, based on the TRPG 1 in a current cell and the TRPG 2 in a target cell, that the mobility type of the terminal is the second mobility type, and further determine that the configuration information of the terminal should be the second configuration information. The network device may send the second configuration information to the terminal.

It should be noted that the values in the foregoing embodiments are merely examples and constitute no limitation on the values. It may be understood that in the embodiments of the present invention, other values may also be set as interval endpoints or calculation results. This is not limited herein.

Figure 13:
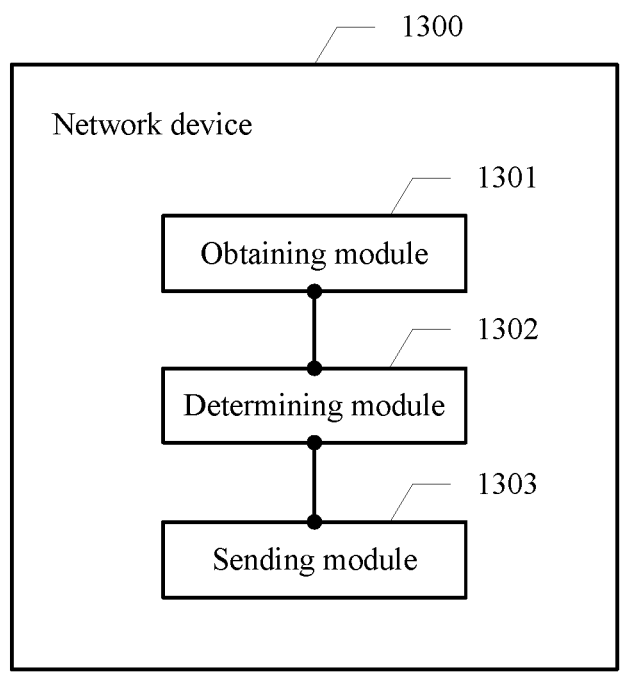
FIG. 13 is a schematic structural diagram of a network device according to an embodiment of the present invention.

The following describes a network device and a terminal that are provided in the present invention. Referring to FIG. 13, an embodiment of a network device 1300 provided in the present invention includes:

an obtaining module 1301, configured to obtain first information and/or second information, where the first information is cell access information, and the second information is beam access information;

a determining module 1302, configured to determine configuration information based on the first information and/or the second information; and a sending module 1303, configured to send the configuration information to a terminal.

Specifically, the obtaining module 1301 is configured to perform step 501 in the embodiment shown in FIG. 5, the determining module 1302 is configured to perform step 502 in the embodiment shown in FIG. 5, and the sending module 1303 is configured to perform step 503 in the embodiment shown in FIG. 5. For specific descriptions of the network device, refer to descriptions in the embodiments or the optional embodiments shown in FIG. 5 to FIG. 9. Details are not described herein again.

Figure 14:
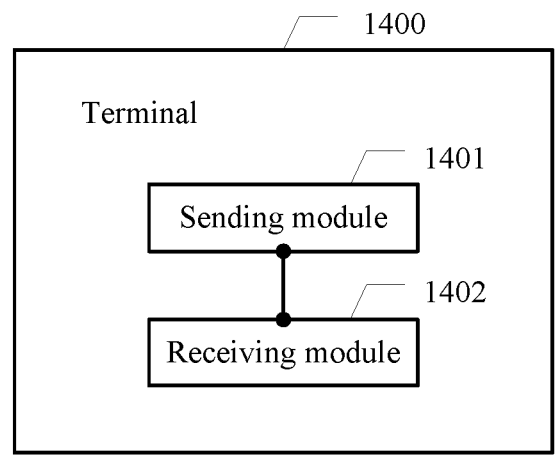
FIG. 14 is a schematic structural diagram of a terminal according to an embodiment of the present invention.

Referring to FIG. 14, an embodiment of a terminal 1400 provided in the present invention includes:

a sending module 1401, configured to send first information and/or second information to a network device, where the first information is cell access information, and the second information is beam access information; and a receiving module 1402, configured to receive configuration information sent by the network device.

Specifically, the sending module 1401 is configured to perform step 501 in the embodiment shown in FIG. 5, the receiving module 1402 is configured to perform step 503 in the embodiment shown in FIG. 5, and the sending module 1303 is configured to perform step 503 in the embodiment shown in FIG. 5. For specific descriptions of the terminal, refer to descriptions in the embodiments or the optional embodiments shown in FIG. 5 to FIG. 9. Details are not described herein again.

Figure 15:
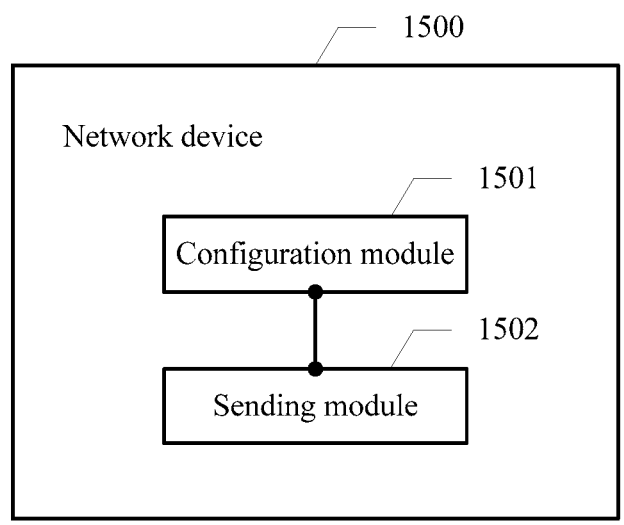
FIG. 15 is another schematic structural diagram of a network device according to an embodiment of the present invention.

Referring to FIG. 15, another embodiment of a network device 1500 provided in the present invention includes:

a configuration module 1501, configured to configure fifth information and/or sixth information based on beam access information, where the fifth information includes at least one of a first threshold, a second threshold, or a third threshold, and the sixth information includes at least one of a first mobility state, a second mobility state, or a third mobility state; and a sending module 1502, configured to send the fifth information and/or the sixth information to a terminal.

Figure 16:
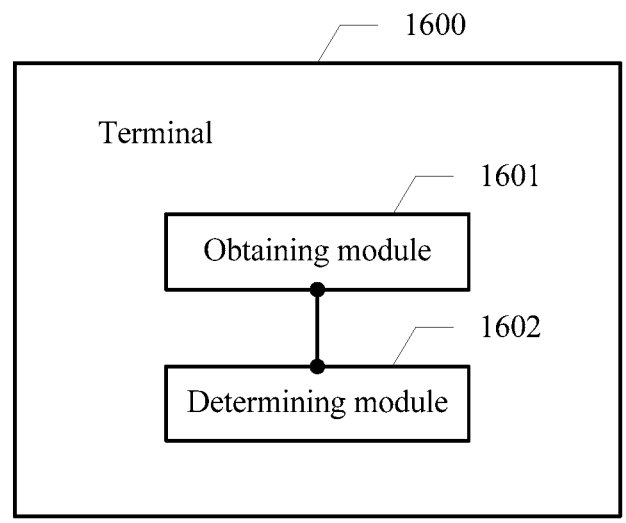
FIG. 16 is another schematic structural diagram of a terminal according to an embodiment of the present invention.

Referring to FIG. 16, another embodiment of a terminal 1600 provided in the present invention includes:

an obtaining module 1601, configured to obtain first information and/or second information, where the first information is cell access information, and the second information is beam access information; and a determining module 1602, configured to determine a mobility status of the terminal based on the first information and/or the second information.

Specifically, the obtaining module 1601 is configured to perform step 1001 in the embodiment shown in FIG. 10, and the determining module 1602 is configured to perform step 1002 in the embodiment shown in FIG. 10. For specific descriptions of the terminal, refer to descriptions in the embodiment or the optional embodiments shown in FIG. 10. Details are not described herein again.

Figure 17:
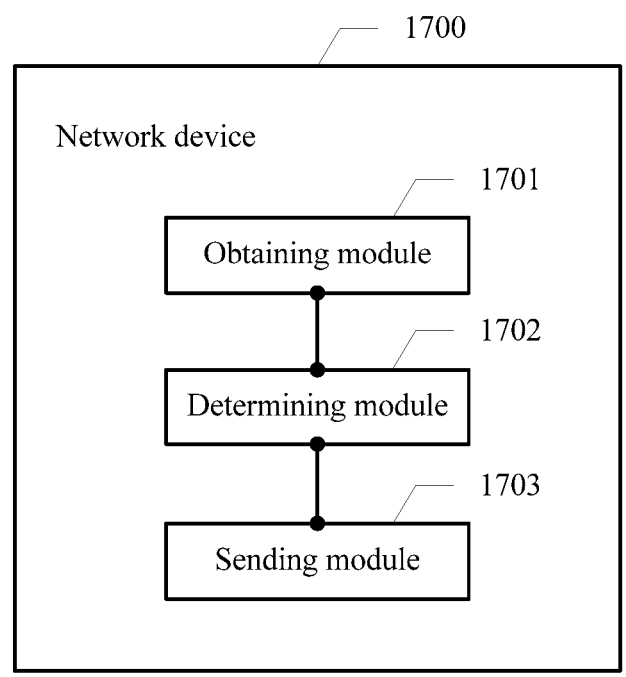
FIG. 17 is another schematic structural diagram of a network device according to an embodiment of the present invention.

Referring to FIG. 17, another embodiment of a network device 1700 provided in the present invention includes:

an obtaining module 1701, configured to obtain a mobility status and/or a mobility type of a terminal;

a determining module 1702, configured to determine configuration information based on the mobility status and/or the mobility type of the terminal; and a sending module 1703, configured to send the configuration information to the terminal.

Specifically, the obtaining module 1701 is configured to perform step 1101 in the embodiment shown in FIG. 11 or step 1201 in the embodiment shown in FIG. 12. The determining module 1702 is configured to perform step 1102 in the embodiment shown in FIG. 11 or step 1202 in the embodiment shown in FIG. 12. The sending module 1703 is configured to perform step 1103 in the embodiment shown in FIG. 11 or step 1203 in the embodiment shown in FIG. 12. For specific descriptions of the network device, refer to descriptions in the embodiment shown in FIG. 11 or descriptions in the embodiment or the optional embodiments shown in FIG. 12. Details are not described herein again.

Figure 18:
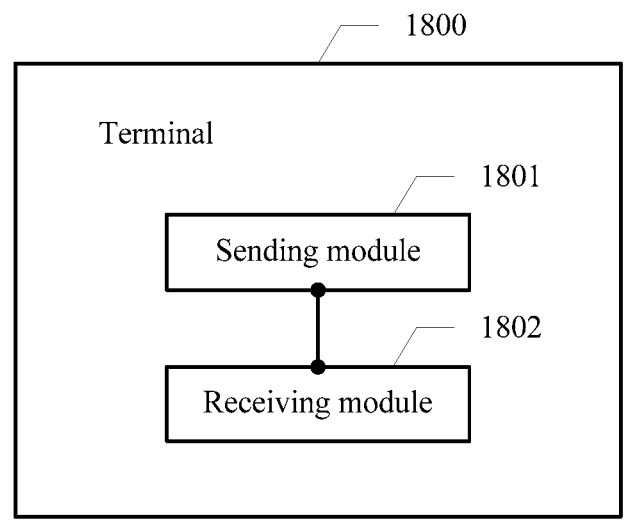
FIG. 18 is another schematic structural diagram of a terminal according to an embodiment of the present invention.

Referring to FIG. 18, another embodiment of a terminal 1800 provided in the present invention includes:

a sending module 1801, configured to send a mobility status and/or a mobility type of the terminal to a network device; and a receiving module 1802, configured to receive configuration information sent by the network device.

Specifically, the sending module 1801 is configured to perform step 1101 in the embodiment shown in FIG. 11 or step 1201 in the embodiment shown in FIG. 12. The receiving module 1802 is configured to perform step 1103 in the embodiment shown in FIG. 11 or step 1203 in the embodiment shown in FIG. 12. For specific descriptions of the terminal, refer to descriptions in the embodiment shown in FIG. 11 or descriptions in the embodiment or the optional embodiments shown in FIG. 12. Details are not described herein again.

The foregoing describes, from a perspective of function modules, the terminal and the network device that are provided in the present invention. The "function modules" herein may be an application-specific integrated circuit (application-specific integrated circuit, ASIC), a processor that executes one or more software or firmware programs, a memory, an integrated logic circuit, and/or another component that can provide the foregoing functions. The following describes, from a perspective of hardware, a terminal and a network device that are provided in the present invention.

Figure 19:
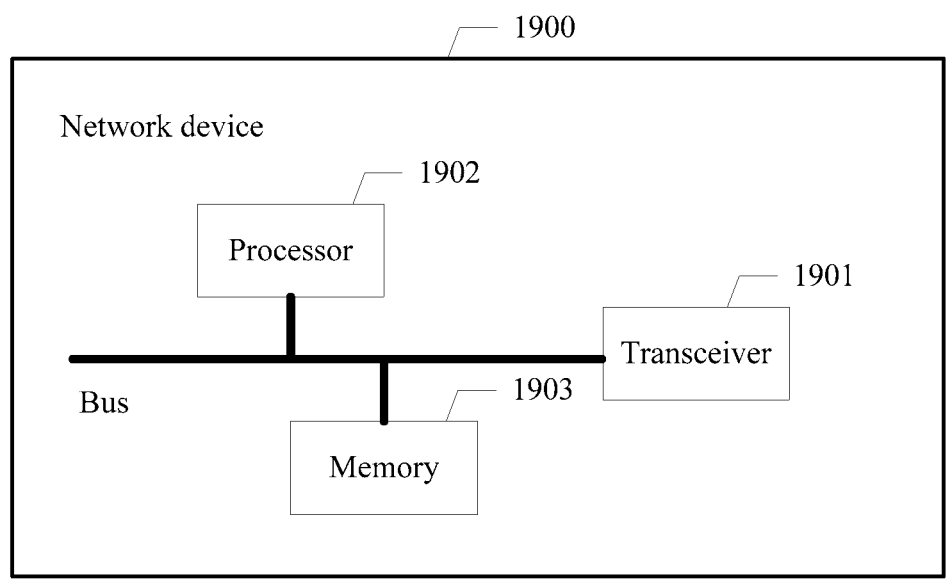
FIG. 19 is another schematic structural diagram of a network device according to an embodiment of the present invention.

Referring to FIG. 19, the present invention provides a network device 1900. The network devices shown in FIG. 13, FIG. 15, and FIG. 17 each can be implemented based on a structure of the network device 1900. The network device 1900 includes a transceiver 1900, a processor 1902, and a memory 1903. The transceiver 1900, the processor 1902, and the memory 1903 are connected to each other by using a bus.

Under control of the processor 1902, the transceiver 1901 is configured to receive or send information.

The memory 1903 is configured to store computer executable program code. The program code includes an operation instruction. One or more storage media (for example, one or more mass storage devices) store an application program or data. The memory 1903 and the storage medium may perform temporary storage or persistent storage. The program stored in the storage medium may include one or more modules (not shown in the figure). Each module may include a series of instruction operations for the network device.

By invoking the operation instruction, the processor 1902 is specifically configured to perform the methods performed by the network device in the embodiments shown in FIG. 5 to FIG. 12.

Figure 20:
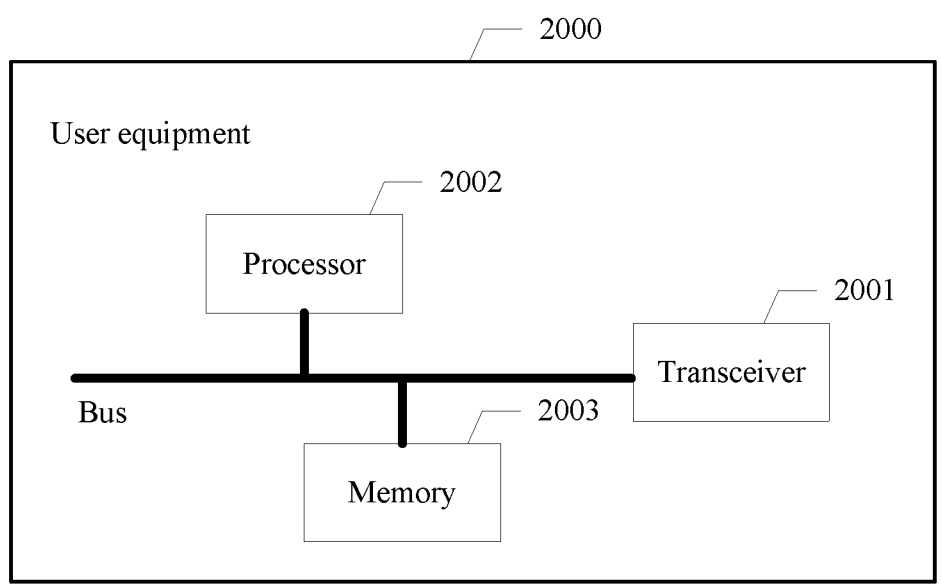
FIG. 20 is another schematic structural diagram of user equipment according to an embodiment of the present invention.

Referring to FIG. 20, the present invention provides user equipment 2000. The terminals shown in FIG. 14, FIG. 16, and FIG. 18 each can be implemented based on a structure of the user equipment 2000. The user equipment 2000 includes a transceiver 2001, a processor 2002, and a memory 2003. The transceiver 2001, the processor 2002, and the memory 2003 are connected to each other by using a bus.

Under control of the processor 2002, the transceiver 2001 is configured to receive or send information.

The memory 2003 is configured to store computer executable program code. The program code includes an operation instruction. By invoking the operation instruction, the processor is specifically configured to perform functions of the terminal in the embodiments shown in FIG. 5 to FIG. 12.

By invoking the operation instruction, the processor 2002 is specifically configured to perform the methods performed by the terminal in the embodiments shown in FIG. 5 to FIG. 12.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A terminal configuration method, comprising:
obtaining, by a network device, first information and second information, wherein the first information is cell access information, and the second information is beam access information;
determining, by the network device, configuration information based on the first information and the second information; and
sending, by the network device, the configuration information to a terminal;
wherein the cell is a 5G cell, and the network device is a base station or a transmission and reception point (TRP);
the cell access information comprises a cell identifier or a residence time of the terminal in the cell; and
a cell type, and the cell type is set based on a quantity of network devices in the cell;
the beam access information comprises a beam identifier or a residence time of the terminal in a beam; and
the cell access information further comprises cell capability information, and the cell capability information comprises at least one of: beamforming capabilities, beam widths, or beam coverage areas of all or some network devices in the cell.

2. The method according to claim 1, wherein the cell access information is cell information of a historical cell accessed by the terminal under a first configuration condition; and
the beam access information is beam information of a historical cell accessed by the terminal under a second configuration condition.

3. The method according to claim 2, wherein
the first configuration condition is a quantity of configured cells, or a configured time segment, or that a network connection status of the terminal is any one of a first state, a second state, or a third state; and
the second configuration condition is a quantity of configured beams, or a configured time segment, or that a network connection status of the terminal is any one of a first state, a second state, or a third state; wherein
the first state is an idle state, the second state is a connected state, and the third state is a connected state defined in a 5G or a new radio system.

4. The method according of claim 1, wherein the obtaining, by the network device, first information and second information comprises:
receiving, by the network device, the first information and the second information from the terminal; or receiving, by the network device, the first information and/or the second information from a surrounding network device, a core network device, or a central controller.

5. The method according to claim 4, wherein before the receiving, by the network device, the first information and the second information from the terminal, the method further comprises:
sending, by the network device, third information to the terminal, wherein the third information is used to instruct the terminal to send the first information and/or the second information; and, wherein
before sending, by the network device, the third information to the terminal, the method further comprises:
receiving, by the network device, fourth information sent by the terminal, wherein the fourth information is capability information of the terminal for obtaining the first information and/or the second information.

6. The method according to claim 1, wherein the determining, by the network device, configuration information based on the first information and/or the second information comprises:
when the network device receives the first information and/or the second information from the terminal, determining, by the network device, a mobility status of the terminal based on the first information and/or the second information; and
determining, by the network device, the configuration information based on the mobility status of the terminal;
the first information comprises a cell type of a historical cell accessed by the terminal, and the determining, by the network device, a mobility status of the terminal based on the first information and/or the second information comprises:
determining, by the network device, a mobility weight for each historical cell based on a cell type;
determining, by the network device, a target quantity of change times based on the mobility weights in the historical cells; and
determining, by the network device based on a preset correspondence between a quantity of change times and a mobility status, a mobility status corresponding to the target quantity of change times.

7. The method according to claim 6, wherein the first information comprises a cell type of a historical cell accessed by the terminal, and the determining, by the network device, a mobility status of the terminal based on the first information and/or the second information comprises:
determining, by the network device, a mobility weight for each historical cell based on a cell type;
determining, by the network device, a target quantity of change times based on the mobility weights in the historical cells; and
determining, by the network device based on a preset correspondence between a quantity of change times and a mobility status, a mobility status corresponding to the target quantity of change times.

8. The method according to claim 7, wherein the first information comprises residence duration of the terminal in the cell; and
the determining, by the network device, a mobility status of the terminal based on the first information or the second information comprises:
determining, by the network device, a cell coverage area for each historical cell based on the cell type, and determining a moving speed of the terminal in the cell based on the cell coverage area and the residence duration of the terminal in the cell; and
determining, by the network device, the mobility status of the terminal based on the moving speed in each historical cell.

9. The method according to claim 6, wherein the first information comprises cell capability information of a historical cell accessed by the terminal, and the determining, by the network device, a mobility status of the terminal based on the first information and/or the second information comprises:
determining, by the network device, a mobility weight for each historical cell based on cell capability information;
determining, by the network device, a target quantity of change times based on the mobility weights in the historical cells; and
determining, by the network device based on a preset correspondence between a quantity of change times and a mobility status, a mobility status corresponding to the target quantity of change times.

10. The method according to claim 6, wherein the determining, by the network device, a mobility status of the terminal based on the first information and/or the second information comprises:
- determining, by the network device, a mobility weight for each historical cell based on a quantity of beams in the cell;
- determining, by the network device, a target quantity of change times based on the mobility weights in the historical cells; and
- determining, by the network device based on a preset correspondence between a quantity of change times and a mobility status, a mobility status corresponding to the target quantity of change times.

11. The method according to claim 6, wherein the determining, by the network device, a mobility status of the terminal based on the first information and/or the second information comprises:
- obtaining, by the network device, a target quantity of beam switching times based on the second information, wherein the second information is the beam information of the historical cell accessed by the terminal; and
- determining, by the network device based on a preset correspondence between a quantity of beam switching times and a mobility status, a mobility status corresponding to the target quantity of beam switching times.

* * * * *

UNITED STATES PATENT AND TRADEMARK OFFICE
CERTIFICATE OF CORRECTION

PATENT NO. : 11,395,200 B2
APPLICATION NO. : 16/345193
DATED : July 19, 2022
INVENTOR(S) : Lili Zhang et al.

Page 1 of 1

It is certified that error appears in the above-identified patent and that said Letters Patent is hereby corrected as shown below:

In the Claims

In Column 29, Line 43, in Claim 4, delete "of" and insert -- to --.

Signed and Sealed this
Twenty-fifth Day of October, 2022

Katherine Kelly Vidal
*Director of the United States Patent and Trademark Office*